US011900796B2

United States Patent
Oyama et al.

(10) Patent No.: US 11,900,796 B2
(45) Date of Patent: Feb. 13, 2024

(54) MAP GENERATION SYSTEM

(71) Applicant: SUBARU CORPORATION, Tokyo (JP)

(72) Inventors: Hajime Oyama, Tokyo (JP); Tomoyuki Kitamura, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 201 days.

(21) Appl. No.: 17/118,205

(22) Filed: Dec. 10, 2020

(65) Prior Publication Data
US 2021/0201662 A1 Jul. 1, 2021

(30) Foreign Application Priority Data

Dec. 30, 2019 (JP) .................................. 2019-240029
Dec. 30, 2019 (JP) .................................. 2019-240030
(Continued)

(51) Int. Cl.
  *G08G 1/01* (2006.01)
  *H04W 4/40* (2018.01)
  (Continued)

(52) U.S. Cl.
  CPC .......... *G08G 1/0112* (2013.01); *B60W 60/001* (2020.02); *G06V 20/58* (2022.01); *G08G 1/0125* (2013.01); *H04W 4/40* (2018.02)

(58) Field of Classification Search
  CPC .... G08G 1/0112; G08G 1/0125; G08G 1/012; G08G 1/0133; G08G 1/0141;
  (Continued)

(56) References Cited

U.S. PATENT DOCUMENTS 10,255,811 B2 4/2019 Naka et al.
2011/0054716 A1* 3/2011 Stahlin .................... G01S 19/45
  701/1
(Continued)

FOREIGN PATENT DOCUMENTS

EP  3 543 864 A1  9/2019
JP  2019-212095 A  12/2019
(Continued)

OTHER PUBLICATIONS

Partial European Search Report issued in corresponding European Patent Application No. 20217529-1001, dated Jun. 1, 2021.
(Continued)

*Primary Examiner* — Yuen Wong
(74) *Attorney, Agent, or Firm* — Rimon P.C.; Tomoki Tanida

(57) ABSTRACT

A map generation system includes a vehicle including a terminal, an input data compilation device, and an output data compilation device. The input data compilation device includes a data reception unit, a data accumulation unit, and a current state map data creation unit. The data reception unit communicates with a communication unit of the terminal. The data accumulation unit accumulates data held by the terminal. The current state map data creation unit creates current state map data using data accumulated by the data accumulation unit, and map data, regional data, or both. The output data compilation device includes a forward region calculation unit and a calculation transmission unit. The forward region calculation unit makes predictive calculation of a forward region of the vehicle, using the current state map data. The calculation transmission unit communicates with the communication unit regarding a result of the predictive calculation.

5 Claims, 12 Drawing Sheets

(30) Foreign Application Priority Data

Dec. 30, 2019 (JP) ................................ 2019-240031
Aug. 31, 2020 (JP) ................................ 2020-145303

(51) Int. Cl.
B60W 60/00 (2020.01)
G06V 20/58 (2022.01)

(58) Field of Classification Search
CPC .......... G08G 1/0145; G08G 1/096708; G08G 1/096741; G08G 1/096775; G08G 1/164; B60W 60/001; G06V 20/58; H04W 4/40; H04W 4/029; H04W 4/44; G01C 21/3407; G01C 21/3602; G01C 21/3804; G01C 21/28
See application file for complete search history.

(56) References Cited

U.S. PATENT DOCUMENTS

| | | | |
|---|---|---|---|
| 2017/0371349 A1 | 12/2017 | Kim et al. | |
| 2018/0141461 A1 | 5/2018 | Sano | |
| 2018/0299285 A1 | 10/2018 | Morita | |
| 2019/0028862 A1 | 1/2019 | Futaki | |
| 2019/0364492 A1 | 11/2019 | Azizi et al. | |
| 2020/0008028 A1* | 1/2020 | Yang | G08G 1/0175 |
| 2020/0166945 A1 | 5/2020 | Kim et al. | |
| 2020/0183389 A1 | 6/2020 | Kim et al. | |
| 2020/0256681 A1 | 8/2020 | Kim et al. | |
| 2020/0349850 A1 | 11/2020 | Park et al. | |
| 2020/0394918 A1 | 12/2020 | Chen | |
| 2021/0031760 A1 | 2/2021 | Ostafew et al. | |
| 2021/0046936 A1 | 2/2021 | Umeda et al. | |
| 2021/0095975 A1 | 4/2021 | Mubarek et al. | |
| 2021/0122373 A1 | 4/2021 | Dax | |
| 2022/0221550 A1 | 7/2022 | Haga et al. | |

FOREIGN PATENT DOCUMENTS

| | | |
|---|---|---|
| WO | 2017/111126 A1 | 6/2017 |
| WO | 2019/031853 A1 | 2/2019 |
| WO | 2019/165737 A1 | 9/2019 |

OTHER PUBLICATIONS

Extended European Search Report issued in corresponding European Patent Application No. 20217529.5-1001, dated Dec. 15, 2021.
European Office Action issued in corresponding European Patent Application No. 20217640.0-1213, dated Jan. 23, 2023.
Lane Definition from Wikipedia, Accessed Apr. 5, 2023.
U.S. PTO Final Office Action issued in related U.S. Appl. No. 17/135,111, dated Apr. 14, 2023.
U.S. PTO Non-Final Office Action issued in related U.S. Appl. No. 17/135,248, dated Apr. 17, 2023.
U.S. PTO Notice of Allowance issued in related U.S. Appl. No. 17/135,361, dated Mar. 29, 2023.
U.S. PTO Final Office Action issued in related U.S. Appl. No. 17/135,284, dated Apr. 26, 2023.
U.S. PTO Final Office Action issued in related U.S. Appl. No. 17/135,329, dated Apr. 26, 2023.
U.S. Non-Final Office Action issued in related U.S. Appl. No. 17/135,382, dated Feb. 2, 2023.

\* cited by examiner

MAP GENERATION SYSTEM

CROSS-REFERENCE TO RELATED APPLICATIONS

This application claims priority from Japanese Patent Application Nos. 2020-145303 filed on Aug. 31, 2020, 2019-240031 filed on Dec. 30, 2019, 2019-240029 filed on Dec. 30, 2019, and 2019-240030 filed on Dec. 30, 2019, the entire contents of which are hereby incorporated by reference.

BACKGROUND

The disclosure relates to a map generation system.

Regarding vehicles such as automobiles, as disclosed in International Publication WO2017/111126, vehicles are allowed to travel to a destination along a path allotted by a server, in a region allotted by the server. This leads to effective utilization of road space, for example, making it possible to alleviate traffic congestion caused by lowered vehicle speeds.

SUMMARY

An aspect of the technology provides a map generation system including a vehicle, an input data compilation device, and an output data compilation device. The vehicle includes a terminal. The terminal includes a communication unit configured to communicate through a network. The input data compilation device includes a data reception unit, a data accumulation unit, and a current state map data creation unit. The data reception unit is configured to communicate with the communication unit of the terminal. The data accumulation unit is configured to accumulate, by the data reception unit, data held by the terminal. The data held by the terminal includes data regarding the vehicle, a surrounding vehicle, or both. The current state map data creation unit is configured to create current state map data using data accumulated by the data accumulation unit, and map data, regional data, or both. The regional data includes data regarding a location of the vehicle. The output data compilation device includes a forward region calculation unit and a calculation transmission unit. The forward region calculation unit is configured to make predictive calculation of a forward region of the vehicle, using the current state map data. The calculation transmission unit is configured to communicate with the communication unit regarding a result of the predictive calculation.

An aspect of the technology provides a map generation system including a vehicle, an input data compilation device, and an output data compilation device. The vehicle includes a terminal. The terminal includes a communication unit configured to communicate through a network. The input data compilation device includes a data accumulation unit and a current state map data creation unit. The data accumulation unit is configured to communicate with the communication unit of the terminal, to accumulate data held by the terminal. The data held by the terminal includes data regarding the vehicle, a surrounding vehicle, or both. The current state map data creation unit is configured to create current state map data using data accumulated by the data accumulation unit, and map data, regional data, or both. The regional data includes data regarding a location of the vehicle. The output data compilation device includes a forward region calculation unit and a calculation transmission unit. The forward region calculation unit is configured to make predictive calculation of a forward region of the vehicle, using the current state map data. The calculation transmission unit is configured to communicate with the communication unit regarding a result of the predictive calculation. A traveling region of the vehicle is determined on the basis of the current state map data. The current state map data includes at least a predetermined piece of the map data in addition to the current state map data. The traveling region determined is partitioned into a plurality of divisions in units of at least a predetermined distance, time, or both.

An aspect of the technology provides a map generation system including a vehicle and circuitry. The vehicle includes a terminal. The terminal includes a communication unit configured to communicate through a network. The circuitry is configured to communicate with the communication unit of the terminal. The circuitry is configured to accumulate data held by the terminal. The data held by the terminal includes data regarding the vehicle, a surrounding vehicle, or both. The circuitry is configured to create current state map data using data accumulated, and map data, regional data, or both. The regional data includes data regarding a location of the vehicle. The circuitry is configured to make predictive calculation of a forward region of the vehicle, using the current state map data. The circuitry is configured to communicate with the communication unit regarding a result of the predictive calculation.

An aspect of the technology provides a map generation system including a vehicle and circuitry. The vehicle includes a terminal. The terminal includes a communication unit configured to communicate through a network. The circuitry is configured to communicate with the communication unit of the terminal, to accumulate data held by the terminal. The data held by the terminal includes data regarding the vehicle, a surrounding vehicle, or both. The circuitry is configured to create current state map data using data accumulated, and map data, regional data, or both. The regional data includes data regarding a location of the vehicle. The circuitry is configured to make predictive calculation of a forward region of the vehicle, using the current state map data. The circuitry is configured to communicate with the communication unit regarding a result of the predictive calculation. A traveling region of the vehicle is determined on the basis of the current state map data. The current state map data includes at least a predetermined piece of the map data in addition to the current state map data. The traveling region determined is partitioned into a plurality of divisions in units of at least a predetermined distance, time, or both.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
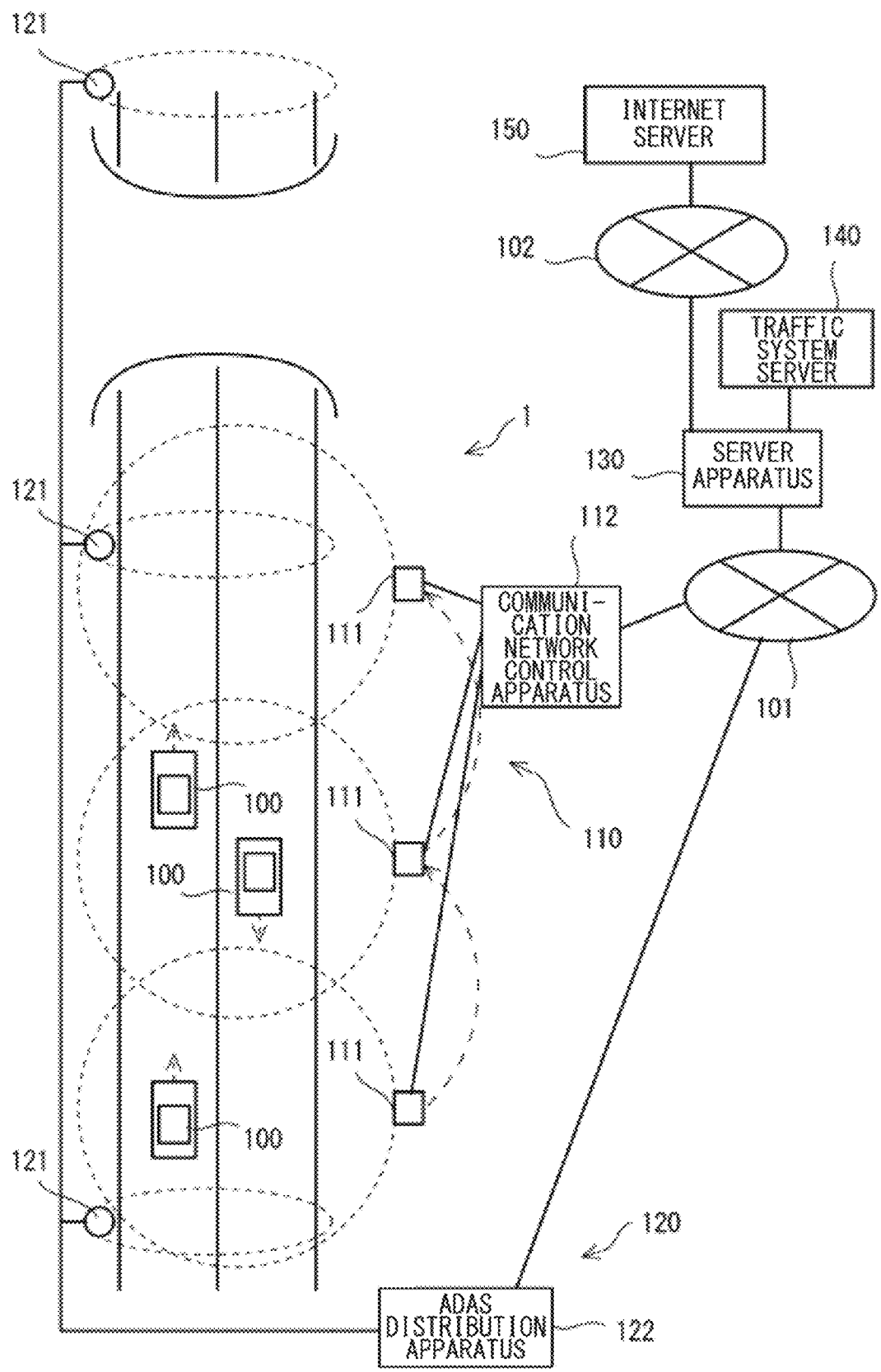
FIG. 1 is a schematic diagram illustrating a course control system configured to make a path selection using a map generation system according to an embodiment of the disclosure.

In vehicle driving, achieving automated driving techniques is expected to provide a quick movement to a destination, and to assist an occupant with traveling operations to provide a higher level of safety in the movement. On the other hand, in the technique disclosed in International Publication WO2017/111126, maps to be provided for reference have lacked immediacy.

It is desirable to provide a map generation system that makes it possible to appropriately generate map data in response to actual traffic situations.

In the following, some embodiments of the disclosure are described in detail with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a dimension of each of the elements, a material of each of the elements, a ratio between the elements, relative positional relationship between the elements, and any other specific numerical value are illustrative only and not to be construed as limiting to the technology. Further, elements in the following example embodiments which are not recited in a most-generic independent claim of the disclosure are optional and may be provided on an as-needed basis. Throughout the specification and the drawings, elements having substantially the same function and configuration are denoted with the same reference characters to avoid redundant description, and elements not in direct relation to the technology may not be illustrated.

Some preferred embodiments of the disclosure are described with reference to FIGS. 1 to 5.

FIG. 1 illustrates an outline of a map generation system 1 according to this embodiment. As illustrated in FIG. 1, a plurality of automobiles 100 as moving bodies is traveling on a road. The map generation system 1 in FIG. 1 is provided for traffic control of, for example, travel of the plurality of the automobiles 100 as a plurality of the moving bodies. Other non-limiting examples of the moving bodies to be traffic controlled may include pedestrians, bicycles, motorcycles, and carts. Such moving bodies, unlike, for example, trains, do not travel on a track, and are each configured to move freely and independently while changing a forwarding direction and a forwarding speed. It is to be noted traffic system data including traffic flow and volume may be used. The traffic system data may be collected by a terminal and/or road management equipment disposed on roadside. Non-limiting examples of the terminal may include a personal communication device such as a mobile phone and a GPS Logger. Non-limiting examples of the road management equipment may include a traffic signal and a traffic data sensor.

In this embodiment, the term "system time" includes transmission absolute time, vehicle time, server time, predicted traveling time, reception absolute time, and actual traveling absolute time. The transmission absolute time is universal time of data transmission by a system or the automobile 100 that are configured to be coupled to a network. The vehicle time is system time inside the automobile 100. The server time is system time inside a server apparatus 130. The reception absolute time is universal time of data reception by the automobile 100. The actual traveling absolute time is universal time when the automobile 100 travels in a certain traveling region. The system time is, unless otherwise noted, current time.

The map generation system 1 may be a system including a communication unit 6 described later, the server apparatus 130, an Internet server 150, and a traffic system server 140. The communication unit 6 is provided in each of the plurality of the automobiles 100. In one embodiment of the disclosure, the communication unit 6 may serve as a "terminal". The server apparatus 130 may be coupled to a closed network 101 as a dedicated line and to an internetwork 102. The closed network 101 is hereinafter also referred to as a network 101. The Internet server 150 may be coupled to the internetwork 102. The traffic system server 140 may be coupled to the network 101, the internetwork 102, or both. The traffic system server 140 may transmit, to the server apparatus 130, traffic data regarding a vehicle transit region. The traffic system server 140 may be, for example, VICS (registered trademark, Vehicle Information and Communication System). The server apparatus 130 and the communication units 6 of the plurality of the automobiles 100 may transmit and receive data to and from one another using a communication network such as the network 101. The server apparatus 130 may include an input data compilation unit and an output data compilation unit. It is to be noted that the internetwork 102 may be configured by the network 101. Configuring the internetwork 102 by the network 101 leads to a higher line speed, but may possibly cause greater capital investments than those for the internetwork 102.

To the network 101, a communication system 110, an advanced traffic system 120, and the traffic system server 140. The communication system 110 may include base stations 111 and a communication network control apparatus 112. The base stations 111 may serve as a plurality of communication devices distributed in a region. The advanced traffic system 120 may include ITS (Intelligent transport (transportation) system). The traffic system server 140 may serve as a road traffic data communication system that transmits the traffic data regarding the vehicle transit region to the server apparatus 130. The traffic system server 140 is hereinafter referred to as the VICS (registered trademark).

The communication network control apparatus 112 may be coupled to the network 101 and a plurality of the base stations 111. The base stations 111 may each transmit and receive various kinds of data to and from a communication device 71 (not illustrated in FIG. 1, refer to FIG. 3) of the automobile 100 covered within a cell as a communication available range. The communication network control apparatus 112 may transmit, to the server apparatus 130, data to be acquired from the base station 111. The communication network control apparatus 112 may transmit, to a selected one of the base stations 111, the data to be acquired from the server apparatus 130. As the communication device 71 moves together with the automobile 100, and the radio base station 111 covering the communication device 71 changes, the communication network control apparatus 112 may perform route switching to transmit and receive data to and from the base station 111 newly covering the automobile 100.

The advanced traffic system 120 may include, as an infrastructure, a plurality of ADAS communication apparatuses 121 and an ADAS distribution apparatus. The plurality of the ADAS communication apparatuses may serve as beacon-type or wireless-type communication apparatuses arranged along roads. The ADAS distribution apparatus 122 may be coupled to the plurality of the ADAS communication apparatuses 121. The ADAS distribution apparatus 122 may transmit, for example, regional traffic data, for each region, to the plurality of the ADAS communication apparatuses 121. The regional traffic data may be transmitted from an unillustrated server apparatus of the advanced traffic system 120 coupled through the network 101. This makes it possible for the plurality of the ADAS communication apparatuses 121 in a predetermined region to transmit, for example, the regional traffic data to the automobile 100 passing nearby. Moreover, the ADAS communication apparatuses 121 may acquire data from the automobile 100 or may have a unique monitoring camera function. In this case, the data transmitted from the automobile 100 and monitoring data may be transmitted to the server apparatus 130 through the ADAS communication apparatuses 121, the ADAS distribution apparatus 122, and the network 101.

The traffic system server 140 may transmit, to the server apparatus 130, VICS (registered trademark) data that constitutes field data, i.e., regional data of a location of the automobile 100. In one example, the regional data may include data related to a movement of a moving body such as the plurality of the automobiles 100 and transmitted by the traffic system server 140. In one example, non-limiting examples of the regional data may include data collected from each of the automobiles 100, road monitoring data, and the regional traffic data based on the road monitoring data. It is to be noted that the traffic system server 140 may incorporate the VICS (registered trademark) data into the regional traffic data transmitted by the server apparatus as part of the advanced traffic system 120.

In the map generation system 1 for the automobile 100, data to be collected by the server apparatus 130 may include, for example, not only the field data, but also the data to be collected from each of the automobiles 100. The data to be collected from each of the automobiles 100 is hereinafter referred to as vehicle-collected data. Non-limiting examples of the vehicle-collected data may include travel data regarding each of the automobiles 100, occupant data related to an occupant, peripheral data of each of the automobiles 100, and the regional traffic data. Non-limiting examples of the travel data regarding the automobile 100 may include a current position, a forwarding direction, a forwarding speed, and a destination. The vehicle-collected data may be transmitted to the server apparatus 130, for each apparatus, that is, for each of the communication units 6 of the automobiles 100 as senders, or for each server apparatus of the advanced traffic system 120.

The server apparatus 130 may collect the vehicle-collected data related to the travel of the plurality of the automobiles 100, and the field data, i.e., the regional data. On the basis of, for example, the vehicle-collected data thus collected, the server apparatus 130 may generate a course in a minute section for each of the automobiles 100, to allow the plurality of the automobiles 100 to safely travel without, for example, colliding with each other. The generated course in the minute section for each of the automobiles 100 may constitute, as a result of predictive calculation, a forward region predictive calculation result 14A. The server apparatus 130 may transmit, repetitively at predetermined time intervals, the forward region predictive calculation result 14A to the communication units 6 of the plurality of the automobiles 100. The server apparatus 130 may generate a 3D region including stereo coordinates (Z-axis), to allow the automobile 100 to safely travel. The automobile 100 may allow the communication unit 6 used by the relevant automobile 100 to receive the forward region predictive calculation result 14A regarding the own vehicle. In a case of automated driving, a travel control ECU 24 (not illustrated in FIG. 1, refer to FIG. 3) may control the automated driving of the automobile 100 in accordance with the forward region predictive calculation result 14A thus received. The travel control ECU 24 may correct the travel of the automobile 100 based on an operation of an occupant, to allow the travel of the automobile 100 to follow the result of the predictive calculation. In this case, it follows that even in a case of manual driving, assistance based on the forward region predictive calculation result 14A is provided and executed. Moreover, the forward region predictive calculation result 14A may be provided to an occupant on a display device 41, described later, of the own vehicle.

Figure 2:
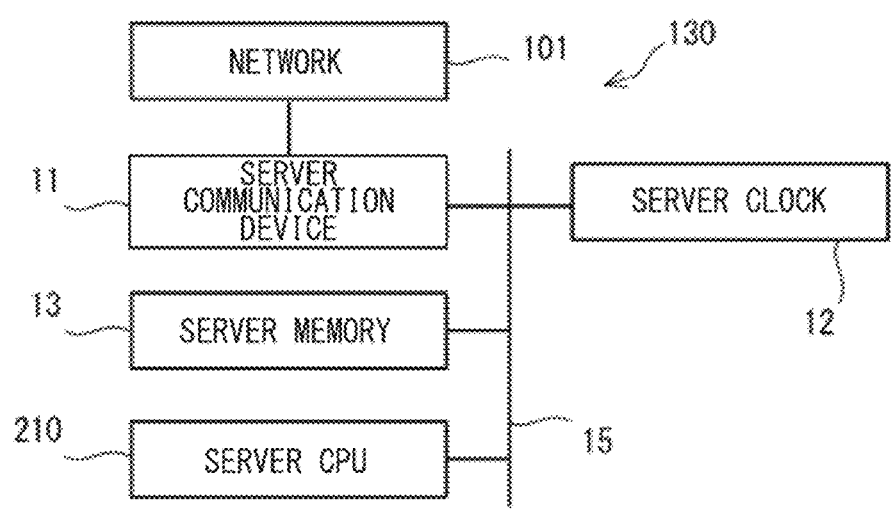
FIG. 2 is a configuration diagram of a server according to an embodiment of the disclosure.

FIG. 2 illustrates a configuration of the server apparatus 130 in FIG. 1. As illustrated in FIG. 2, the server apparatus 130 may include a server communication device 11, a server clock 12, a server memory 13, a server CPU 210, and a server bus 15. The server communication device 11 may be coupled to the network 101, and communicate with the automobile 100, the communication system 110, the advanced traffic system 120, and the traffic system server 140 through the network 101. In one embodiment of the disclosure, the server communication device 11 may serve as a "data reception unit" and a "calculation transmission unit". The server clock 12 may receive and hold GNSS (Global Navigation Satellite System) and VICS (registered trademark) time. The server memory 13 may accumulate the vehicle-collected data and the field data. In one embodiment of the disclosure, the server memory 13 may serve as a "data accumulation unit". The server CPU 210 may generate current state map data, and make the predictive calculation of a forward region of the automobile 100 at time ahead of the absolute time, using the current state map data. In one embodiment of the disclosure, the server CPU 210 may serve as a "current state map data creation unit" and a "forward region calculation unit". To the server bus 15, the server communication device 11, the server clock 12, the server memory 13, and the server CPU 210 may be coupled. It is to be noted that the server communication device 11 may be provided separately for the "data reception unit" and the "calculation transmission unit".

Figure 3:
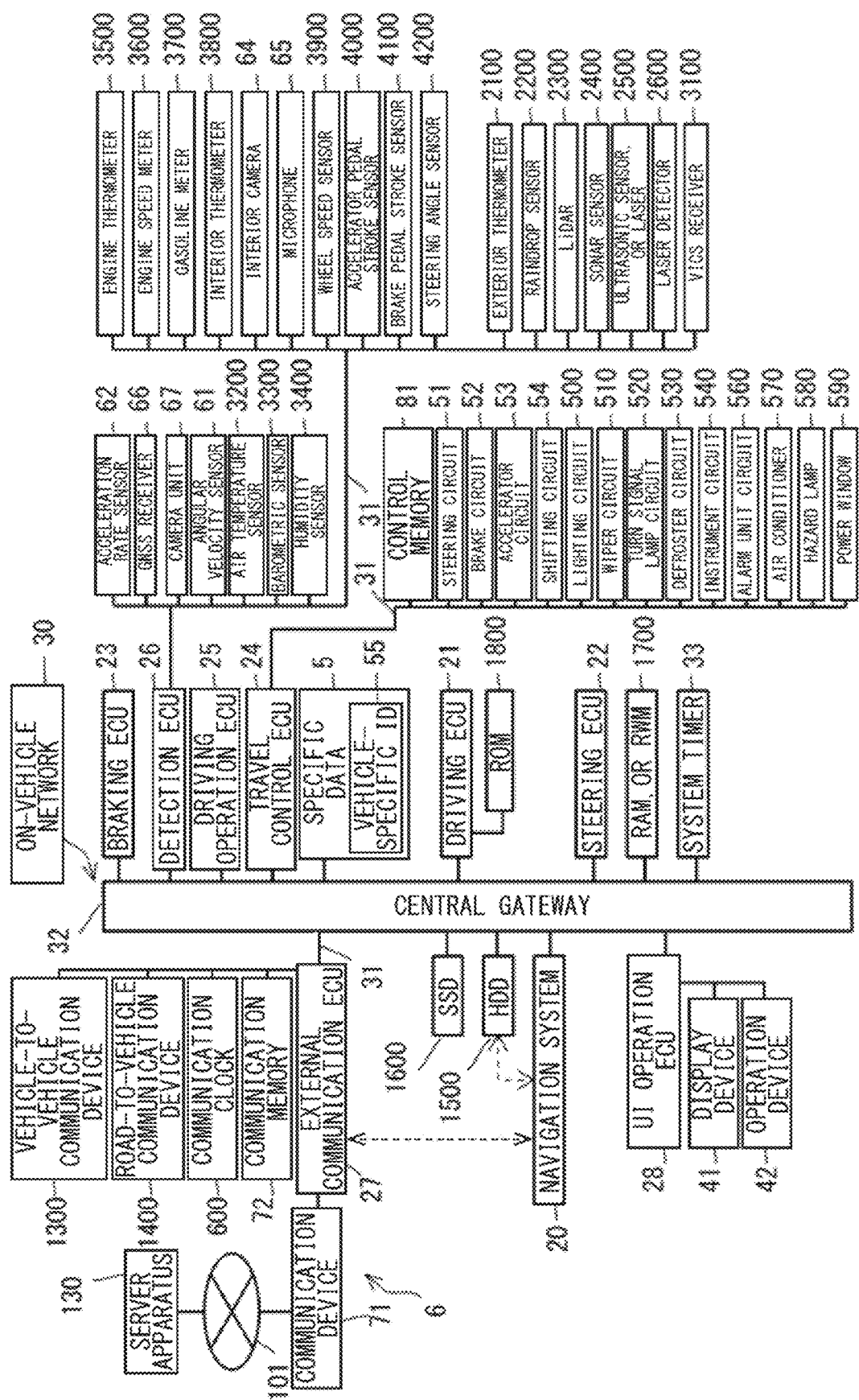
FIG. 3 is a configuration diagram of a vehicle according to an embodiment of the disclosure.

The automobile 100 may include the communication unit 6, detection data regarding the automobile 100, and specific data 5 (not illustrated in FIG. 2, refer to FIG. 3). The communication unit 6 is provided for communication with the outside of the automobile 100. In the automobile 100, when an occupant inputs a particular destination A into, for example, a navigation system 20 (not illustrated in FIG. 2, refer to FIG. 3), the automobile 100 may transmit a request for a path to the destination A, to the server apparatus 130 through the network 101. The server apparatus 130 includes the input data compilation device and the output data compilation device. The input data compilation device accumulates data and generates the current state map data. The output data compilation device makes the predictive calculation of the forward region of the automobile 100 from the current state map data and transmits the result of the predictive calculation to the communication unit 6 of the automobile 100. Thus, the server apparatus 130 may process the request for the path to the destination A of the automobile 100.

The server apparatus 130 transmits, to the communication unit 6 of each of the automobiles 100, the forward region predictive calculation result 14A. The forward region predictive calculation result 14A may include any data that allows each of the automobiles 100 to travel while following the data, e.g., the forwarding direction and the forwarding speed. The result of the predictive calculation may include data such as an estimated current position and a maximum forwardable distance. The automobile 100 may allow the communication unit 6 to keep receiving, repetitively at predetermined time intervals, such a result of the predictive calculation, which causes the automobile 100 to keep on traveling along an instructed course. Whether the automated driving or the manual driving, the automobile 100 may travel while following the instructed course to be acquired repetitively for each minute section. This makes it possible for the automobile 100 to travel to the destination A.

The input data compilation device includes a data accumulation unit and a current state map creation data unit, and constitutes part of the map generation system 1. The data accumulation unit may collect and accumulate the peripheral data and regional data through the network 101. The peripheral data may include, for example, data from an unillustrated mobile phone terminal, a roadside traffic system such as an unillustrated traffic signal, the advanced traffic system 120, and the traffic system server 140. The mobile phone terminal may be a terminal configured to be coupled to a network. The peripheral data may further include GNSS signals and various kinds of data held by the automobile 100. The data held by the automobile 100 may include, for example, a temperature of the surroundings of the automobile 100, the weather, shaded places on roads, positions of humans and structural objects, surrounding vehicles, lanes, and road data. The regional data may include various kinds of data such as weather forecasts regarding a region where the relevant automobile 100 is currently located or a region where the relevant automobile 100 is scheduled to travel, unique wind directions, event information such as festivals, and setting of High-Occupancy Vehicle.

These groups of data may have two pieces of time data: the system transmission absolute time; and the server time. The system transmission absolute time is time at which the data is collected. The server time is time at which the current state map data creation unit imparts time data.

The current state map data creation unit may generate the current state map data 14 regarding the path to the destination A from the map data, the peripheral data collected, and the regional data. The map data may include, for example, road data.

The VICS (registered trademark) data constituting the regional data may be collected by the server apparatus 130, or alternatively, the VICS (registered trademark) data may be collected by the automobile 100 and transmitted to the server apparatus 130. Time of collection of the regional data may be scheduled transit time, the vehicle time, or the server time. In a case where the automobile 100 is stopped and parked, and is available for collection of the peripheral data and the regional data, the automobile 100 may collect the peripheral data and the regional data. Regardless of whether the automobile 100 is traveling, stopped, or parked, communication may be made regarding the collected data, as long as communication with the communication unit 6 is available.

In a scheduled traveling path on which the automobile 100 is to travel, wide-area regional data to the destination A and latest traveling regional data to the destination A may be considered differently, as first regional data and second regional data respectively. In this case, the first regional data and the second regional data can be weighed differently (for, example, higher priority may be given to the second regional data), and thus the scheduled traveling path to the destination A can be generated more precisely.

The output data compilation device may make simulation, using the current state map data 14, of relative positional relation of any one of the plurality of the automobiles 100 to the other automobiles 100 at the actual traveling absolute time on the path to the destination A. The forward region predictive calculation result 14A may be calculated, in additional consideration of a region that the automobile 100 is inhibited from entering on the basis of the specific data 5 held by the automobile 100, and in additional consideration of a region that an automobile is inhibited from passing through before time of arrival of the automobile 100 at the destination A on the basis of the current state map data 14.

The output data compilation unit may transmit the forward region predictive calculation result 14A to the automobile 100 through the network 101. The automobile 100 may allow the communication unit 6 to receive the forward region predictive calculation result 14A, and determine, on the basis of the forward region predictive calculation result 14A, a travel path, i.e., the forward region at predetermined time to the destination A. In a case where the automobile 100 is a vehicle configured to perform the automated driving, the automobile 100 may travel by the automated driving in accordance with the forward region.

FIG. 3 illustrates a configuration of a vehicle according to an embodiment of the disclosure. In one embodiment of the disclosure, the automobile 100 may serve as the "vehicle". In the automobile 100, a plurality of control devices may be incorporated. The plurality of the control devices may constitute a control system that controls the automobile 100. The plurality of the control devices is hereinafter also referred to as various ECUs (Electronic Control Units).

The control system of the automobile 100, or the control devices, may include the various ECUs, a ROM (Read Only Memory) 1800, a RAM (Random Access memory) or an RWM (Read write memory) 1700, an HDD (hard disk drive) 1500, and/or an SSD (Solid State Drive) 1600, input and output ports, a system timer 33, a communication clock 600, an internal bus to which the forgoing components are coupled, a vehicle-specific ID 55, and existing map data K. The input and output ports may be coupled to an object to be controlled or a state detection device thereof. The system timer 33 may measure time and the vehicle time regarding in-vehicle data. The communication clock 600 may hold the server time regarding the server apparatus 130, which is described later. The vehicle-specific ID 55 may constitute the specific data 5 including items of vehicle inspection certificates of the automobile 100. In one embodiment of the disclosure, the vehicle-specific ID 55 may serve as "vehicle data". The existing map data K may be held in, for example, a recording medium of the automobile 100, or a terminal device such as a mobile phone.

It is to be noted that the existing map data K is unnecessary as long as the communication with the server apparatus 130 is available. Map data to be involved in traveling may be obtained from the server apparatus 130.

The communication clock 600 may be provided in an external communication ECU 27 described below.

In one example, the various ECUs may include, for example, a driving ECU 21, a steering ECU 22, a braking ECU 23, the travel control ECU 24, a driving operation ECU 25, a detection ECU 26, the external communication ECU 27, and a UI operation ECU 28. The driving ECU 21 may perform a control related to driving of, for example, an engine. The steering ECU 22 may perform a control related to steering such as power steering. The braking ECU 23 may relate mainly to braking, and make a braking-related control such as braking for mitigation of collision damages.

It is to be noted that the control system of the automobile 100 may include unillustrated other control ECUs.

The various control devices may be coupled to an on-vehicle network 30 adopted in the automobile 100. Non-limiting examples may include a CAN (Controller Area Network), a LIN (Local Interconnect Network), a LAN (Local Area Network), a FlexRay network, and a CXPI (Clock Extension Peripheral Interface) network. The on-vehicle network 30 may include a plurality of bus cables 31 and a central gateway (CGW) 32. The plurality of the bus cables 31 is configured to be coupled to the various control devices. The central gateway 32 may serve as a relay device to which the plurality of the bus cables 31 is coupled. To the various control devices, their respective IDs (identifications) may be assigned. The IDs may differ from one another and serve as identification data. Each of the various ECUs may output, basically on a periodical basis, data to one or more of the other ECUs. To the data, the ID of the sender ECU and the ID of the receiver ECU may be attached. The other ECUs than the sender ECU may monitor the bus cables 31. For example, in a case where any one of the other ECUs finds the ID of the receiver ECU to match its own ID, the relevant ECU may acquire the data and execute processing based on the data.

The central gateway 32 may monitor each of the plurality of the bus cables 31 coupled to the central gateway 32. For example, in a case where the central gateway 32 detects one or more of the control ECUs coupled to any one of the bus cables 31 different from the bus cable 31 to which the sender ECU is coupled, the central gateway 32 may supply the data to the relevant one of the bus cables 31. With such relay processing by the central gateway 32, it is possible for each of the various control devices to send the data to one or more of the other control devices coupled to respective ones of the bus cables 31 different from the bus cable 31 to which the sender control device is coupled. It is also possible for each of the various control devices to receive the data from any one of the various control devices coupled to the corresponding one of the bus cables 31 different from the bus cable 31 to which the receiver control device is coupled. Moreover, to the central gateway 32, the system timer 33 may be coupled. The system timer 33 may measure a period of time from an output of data to the various control devices to reception of a result of the execution of the processing, the time of the output of the data, and the time of the reception of the result. The central gateway 32 may count up or count down, from the universal time, the time to be measured by the system timer 33, or alternatively, the central gateway 32 may measure an amount of time involved in the control. Furthermore, notification may be made to the plurality of the control ECUs through the on-vehicle network 30.

The UI operation ECU 28 may include, for example, the display device 41 and an operation device 42, as occupant interface equipment for interface with an occupant who is riding. As the display device 41, for example, a liquid crystal device or an image projecting device may be used. As the operation device 42, for example, a touchscreen, a keyboard, a contactless operation detecting device, or a speech recognizing device may be used. The display device 41 and the operation device 42 may be installed, for example, in a cabin where occupants are seated. The UI operation ECU 28 may acquire, for example, data regarding a driving operation from the on-vehicle network 30, and display the data on the display device 41. The UI operation ECU 28 may output, as UI operation data, an operation input on the operation device 42 by an occupant, to the on-vehicle network 30. Moreover, the UI operation ECU 28 may carry out processing based on the operation input, and incorporate a result of the processing into the UI operation data. In the UI operation ECU 28, for example, the display device 41 may be coupled to, for example, the navigation system 20. Data in the navigation system 20 may be held by the HDD 1500 and/or the SSD 1600. The UI operation ECU 28 may allow the display device 41 to display the data in the navigation system 20, to allow for the setting of, for example, the destination A. The UI operation ECU 28 may search for a path to the destination A selected by the operation input. The path to the destination A (hereinafter, path data) may include attribute data regarding a road to be used for a movement from a current position to the destination A. Non-limiting examples of the attribute data may include lanes, lane lines, right-turn lanes or left-turn lanes, one-way roads, and lane regulation.

It is to be noted that the display device 41 may display data such as audio data, and include a notification system configured to, for example, play music in the cabin, and giving, for example, an alarm notification to inside and outside the automobile 100.

The navigation system 20, together with an unillustrated own-vehicle relative position detection unit, may be coupled to an unillustrated own-vehicle map position detection unit. The own-vehicle map position detection unit is configured to detect the current position of the automobile 100 that has made a request for vehicle behavior (hereinafter, a behavior request), by referring to the existing map data K, and by communicating with the outside through the networks. In the following description, the automobile 100 that has made the behavior request is referred to as an automobile 100A. The navigation system 20 may include a high-precision road map database including a large-capacity storage medium such as the HDD 1500. The high-precision road map database may hold high-precision road map data (dynamic map). The high-precision road map data (hereinafter, road map data) may hold lane data involved in the execution of the automated driving. Non-limiting examples of the lane data may include lane width data, lane center position coordinate data, lane forwarding azimuth angle data, and speed limitation. The lane data may be held at intervals of several meters in each lane on the road map data.

The navigation system 20 may receive positioning signals from GNSS satellites to acquire position coordinates of the automobile 100A, and perform map-matching of the position coordinates on the road map data to construct a coordinate system to estimate an own-vehicle position on the road map data. In addition, in an environment where a valid positioning signal is hardly received from a positioning satellite, for example, in traveling inside a tunnel, the navigation system 20 may switch to autonomous navigation and estimate the own-vehicle position on the road map data, on the basis of, for example, the vehicle speed detected by the detection ECU 26, an angular velocity detected by a gyro sensor, a longitudinal acceleration rate detected by a longitudinal acceleration rate sensor 62 described later.

Thus, the navigation system 20 may acquire the own-vehicle position on the road map data and the road map data regarding the surroundings thereof. When a driver sets the destination A on the road map data, the navigation system 20 may calculate and set a traveling route from the own-vehicle position, i.e., the current position, to the destination A on the basis of the road map data.

The own-vehicle relative position detection unit may include a vehicle-to-vehicle communication device 1300 and a road-to-vehicle communication device 1400. The vehicle-to-vehicle communication device 1300 is configured to perform intervehicle communication (V2V, or Vehicle-to-Vehicle, Communication). The road-to-vehicle communication device 1400 is configured to perform communication between a vehicle and a device installed on a road. The vehicle-to-vehicle communication includes transmitting and receiving electromagnetic waves such as millimeter waves to each other, to acquire, for example, a distance to a surrounding vehicle, a relative speed, identification data regarding the surrounding vehicle. The road-to-vehicle communication may be performed by, for example, a dedicated narrow area communication (DSRC: Dedicated Short Range Communication) method, or may be performed by other communication methods. The road-to-vehicle communication may be used to obtain data regarding a place closer to the automobile 100A than a camera unit 67 or data regarding a blind spot.

Data acquired by the camera unit 67 and data acquired by the navigation system 20 may be also read on the occasion of the setting of the destination A in conjunction with the traveling route to allow the automobile 100A to travel. Such data may be transmitted, together with the detection data, to the server apparatus 130. It is to be noted that the camera unit 67 may include a stereo camera.

To the driving operation ECU 25, for example, a traveling operation member and an unillustrated motor may be coupled as operation members. The traveling operation member is provided for an occupant to control the travel of the automobile 100. The unillustrated motor is related to a control of a driving environment operation member to be involved in the driving.

Non-limiting examples of the traveling operation member to be coupled may include a steering circuit 51, a brake circuit 52, an accelerator circuit 53, a shifting circuit 54, an lighting circuit 500, a wiper circuit 510, a turn signal lamp circuit 520, a defroster circuit 530, an instrument circuit 540, an alarm unit circuit 560, and other circuits related to security components and critical security components. Non-limiting examples of the driving environment operating member to be coupled may include an air conditioner 570, a hazard lamp 580, and a power window 590. When any operation is made on the operation member, the driving operation ECU 25 may output driving operation data to the on-vehicle network 30. The driving operation data may include, for example, presence or absence of the operation, and an amount of the operation. Moreover, the driving operation ECU 25 may execute processing regarding the operation on the operation member, and incorporate a result of the processing into the driving operation data. For example, in a case where the accelerator circuit 53 to which an accelerator pedal is coupled is operated, with presence of, for example, other moving objects or fixed objects in the forwarding direction of the automobile 100, the driving operation ECU 25 may make a determination that the operation is abnormal, and incorporate a result of the determination into the driving operation data.

The detection ECU 26 may include configurations that acquire operation data regarding the driving operation ECU 25, and configurations that detect a traveling state of the automobile 100, to detect a vehicle state of the automobile 100. In one example, configurations that detect an internal vehicle state of the automobile 100 may include, for example, an engine thermometer 3500, an engine speed meter 3600, a gasoline meter 3700, an interior thermometer 3800, an interior camera 64, and a microphone 65. The interior camera 64 may capture an image of an occupant inside the automobile 100. The microphone 65 may convert a sound inside the automobile 100 into a digital signal, to make it possible for the various control devices to use the digital signal as the detection data.

Configurations that detect an internal traveling state of the automobile 100 may include, for example, an angular velocity sensor 61 and the acceleration rate sensor 62. The angular velocity sensor 61 may detect an operation speed related to various kinds of braking provided in the automobile 100. Non-limiting examples may include an amount of steering and a steering speed of electric power steering. The acceleration rate sensor 62 may detect an acceleration rate of the automobile 100.

Configurations that detect an external vehicle state of the automobile 100 may include, for example, an exterior thermometer 2100, a raindrop sensor 2200, the camera unit 67, LIDAR (Light Detection and Ranging, or Laser Imaging Detection and Ranging) 2300, a sonar sensor 2400 and/or an ultrasonic sensor 2500, a laser detector 2600, a GNSS receiver 66, a VICS (registered trademark) receiver, and other various sensing devices. The camera unit 67 may serve as an all-round camera that performs imaging of external surroundings of the automobile 100. The camera unit 67 may be provided at least in front and rear parts of the automobile 100. The LIDAR 2300 may perform optical detection and ranging, or perform image detection and ranging by a laser. The GNSS receiver 66 may detect the position of the automobile 100.

Furthermore, the automobile 100 may recognize, on the basis of the detection data received by the detection ECU 26, for example, a surrounding automobile 100B traveling in front of, around, or behind the automobile 100, falling objects in a traveling direction of the automobile 100 on a road, irregularities of a road surface, flooding, snow, falling objects on a road shoulder or a road, such an adjacent lane, on which the automobile 100 normally can travel, and damage to the road, using techniques such as pattern matching. In addition, the automobile 100 may obtain a lane width, i.e., a width between lane lines that define left and right edges of a lane to be traveled by the automobile 100. The automobile 100 may calculate a midpoint of the vehicle width, i.e., a lane center, and set the lane center as a target forwarding path of the automobile 100.

The automobile 100 may further include not only the raindrop sensor 2200 but also an air temperature sensor 3200, a barometric sensor 3300, and a humidity sensor 3400, to obtain weather data around the automobile 100.

In addition to the data acquired by the detection ECU 26, the automobile 100 may allow the communication unit 6 to acquire vehicle exterior data, to infer dry and frozen conditions of the road surface. Non-limiting examples of the vehicle exterior data may include weather forecasts, weather alarms and warnings, typhoon data, flood data, sediment disaster data, tornado data, tsunami data, earthquake data, and eruption data.

The detection ECU 26 may acquire the detection data from the various detection configurations, i.e., the sensors, and output the detection data to the on-vehicle network 30. Moreover, the detection ECU 26 may execute processing based on the detection data, and incorporate a result of the processing into the detection data. For example, the acceleration rate sensor 62 may detect gravity, vibration and motion, and impact, and thereupon, the detection ECU 26 may determine that a right or left turn has been detected, and incorporate a result of detection of a route change into the detection data. The detection ECU 26 may extract, on the basis of a result from a vehicle exterior detection device such as the camera unit 67 and the ultrasonic sensor, or radar, a moving object and/or a traffic inhibition state. Non-limiting examples of the moving object may include a pedestrian and the surrounding automobile 100B that are present around the own vehicle. Non-limiting examples of the traffic inhibition state may be caused by, for example, a temporarily stopped vehicle or a vehicle involved in an accident. The detection ECU 26 may determine a kind or attributes of the moving object or a fixed object (including the traffic inhibition state), and make estimation of a relative direction, a relative distance, and a direction of movement of the moving object or the fixed object in accordance with a position, a size, or a change of the moving object or the fixed object in an image. The detection ECU 26 may incorporate data regarding the moving object or the fixed object including a result of the estimation into the detection data, and output the resultant data to the on-vehicle network 30. It is to be noted that another ECU may make the determination using the detection data, or alternatively, a determination unit may be provided in the server apparatus 130.

It is to be noted that the acceleration rate sensor 62 may be provided as a wheel speed sensor 3900, or may be used in combination with the wheel speed sensor 3900.

Furthermore, the wheel speed sensor 3900, an accelerator pedal stroke sensor 4000, a brake pedal stroke sensor 4100, and a steering angle sensor 4200 may be provided to sense the traveling state regarding the automobile 100A. The wheel speed sensor 3900 and the acceleration rate sensor 62 are provided for detection of the vehicle speed. The accelerator pedal stroke sensor 4000 is provided for detection of magnitude of an amount of fuel supplied to the engine, that is, magnitude of a propulsion force to be obtained by the automobile 100. The engine may serve as a power source of the automobile 100. The brake pedal stroke sensor 4100 is provided, as appropriate, for detection of magnitude of braking power to be received by the automobile 100.

The detection ECU 26 may detect a selection of any one from three modes held by the automobile 100, i.e., a manual driving mode, an automated driving mode, and an automatic retraction mode. In the manual driving mode, the driver may perform the driving operation. The automated driving mode includes allowing the automobile 100 to travel autonomously toward the destination A. The automatic retraction mode includes making a transition to the automated driving mode, without making a transition to the manual driving mode, to automatically guide the automobile 100 to a safe place such as a roadside, in a case where the automobile 100 is traveling in the automated driving mode, and a determination is made that continuation of the automated driving mode is difficult and that a braking distance and time at which emergency braking becomes necessary are yet to occur. Here, the situation that the continuation of the automated driving mode is difficult may include, for example, a case where a large steering angle θst is detected by the steering angle sensor 4200. In such a situation, it is presumed that the driver has flung himself or herself face downward on a steering wheel in a non-awake condition such as syncope or unconsciousness. The automated driving mode includes allowing the automobile 100 to perform autonomous travel, or the automated driving, along the target forwarding path. It is to be noted that the automated driving mode may be further subdivided into a grip keeping mode and a hands-off mode. The grip keeping mode includes instructing the driver to keep a grip of the steering wheel. The hands-off mode does not include instructing the driver to keep the grip of the steering wheel. In this embodiment, these are collectively referred to as the automated driving mode.

To the travel control ECU 24, a control memory 81, the HDD 1500, the SSD 1600, the ROM 1800, and the RAM (RWM) 1700 may be coupled. The control memory 81, the HDD 1500, the SSD 1600, the ROM 1800, and the RAM (RWM) 1700 may be computer-readable recording media, and hold, for example, programs to be executed by the travel control ECU 24, and setting values. For example, the control memory 81 may hold data regarding control contents by the travel control ECU 24. The HDD 1500 and the SSD 1600 may hold the vehicle-specific ID 55, the map data, and the navigation system 20. In one embodiment of the disclosure, the vehicle-specific ID 55 may serve as the "vehicle data". The ROM 1800 may constitute part of the driving ECU 21, and be used for an ECM (Engine Control Module). The RAM (RWM) 1700 may be used as a main storage device of the various ECUs.

The travel control ECU 24 may read the programs from the control memory 81, the HDD 1500, the SSD 1600, the ROM 1800, and/or the RAM (RWM) 1700, and execute the programs.

The travel control ECU 24 may acquire data from the various ECUs such as the external communication ECU 27, the detection ECU 26, and the driving operation ECU 25, and from the sensing devices, through the on-vehicle network 30, to execute a control of the travel of the automobile 100 for the automated driving or driver assistance with the manual driving.

The travel control ECU 24 may generate travel control data on the basis of various kinds of data acquired. The travel control data is provided for the control of the travel of the automobile 100. The travel control ECU 24 may output the travel control data to the driving ECU 21, the steering ECU 22, and the braking ECU 23. The driving ECU 21, the steering ECU 22, and the braking ECU 23 may control the travel of the automobile 100 on the basis of the travel control data thus supplied.

The vehicle-specific ID 55 of the automobile 100 is data uniquely set for the relevant vehicle. Non-limiting examples may include an entry-prohibited region based on a vehicle number, a predetermined day of the week and time of prohibition of vehicle entry, permission to use an Express lane, presence or absence of use of an ETC card or Vignette, a width of a vehicle body, and presence or absence of specifications for cold districts.

Regarding the specific data 5, the server ID of the server as a communication partner may be held, as the specific data 5, in the vehicle-specific ID 55. On the occasion that the automobile 100 makes the behavior request of the server apparatus 130, the specific data 5 of the automobile 100 including the server ID may be transmitted to the server apparatus 130. This makes it possible for the server apparatus 130 to recognize the automobile 100 as the automobile 100A that has transmitted the request. It is to be noted that the specific data 5 may include the vehicle time.

The external communication ECU 27 may include the communication device 71 and a communication memory 72, and constitute a communication unit. To the external communication ECU 27, the communication clock 600 may be coupled. The communication device 71 may transmit and receive data transmitted and received by the external communication ECU 27, to and from outside the automobile 100, e.g., the base station 111, the communication unit 6 of the surrounding automobile 100B, or the ADAS communication apparatuses 121. The communication memory 72 may be a computer-readable recording medium, and hold programs to be executed by the external communication ECU 27, setting values, and data to be transmitted and received by the external communication ECU 27.

The external communication ECU 27 may transmit and receive data to and from, for example, the server apparatus 130 using the communication device 71. The external communication ECU 27 may collect own-vehicle data through, for example, the on-vehicle network 30, to transmit the own-vehicle data to the server apparatus 130.

Regarding an interval of the communication with the server apparatus 130, a predetermined time interval or a predetermined distance interval may be used. In one example, communication at a predetermined time interval may be used from the viewpoint of immediacy.

The own-vehicle data may include, for example, the in-vehicle data, the detection data, and the specific data 5. Non-limiting examples of the in-vehicle data may include a state of an occupant who is riding, and the operation data. Non-limiting examples of the detection data may include the data regarding the traveling state of the own vehicle, and the peripheral data including travel environment of the own vehicle. The peripheral data may include data regarding other moving objects and fixed objects that are present in the surroundings. The external communication ECU 27 may acquire, for example, the forward region predictive calculation result 14A from the communication device 71. The forward region predictive calculation result 14A may be transmitted by the server apparatus 130 to the own vehicle. The external communication ECU 27 may store the forward region predictive calculation result 14A in the communication memory 72.

It is to be noted that the communication clock 600 may be provided in the external communication ECU 27, to constitute the communication unit. The communication clock 600 may hold the time of reception on the occasion of communication with the outside, and attach communication time and/or the vehicle time to various kinds of data to be transmitted on the occasion of the communication. The vehicle time may be the system time of the automobile 100. The communication clock 600 may be synchronized with the system timer 33. In this case, there is possibility of clock skew between absolute time of each of the various ECUs, the server time of the reception on the occasion of transmission and reception, and official time included in the GNSS data and the VICS (registered trademark) data that are separately received by the communication unit. However, the absolute time may be adjusted to the official time or to the server time. In this case, it is possible to reduce a processing load of adjustment of the absolute time on server side, leading to reduction in processing of generating the world map including the three-dimensional coordinates.

Description moves on to a control of the courses of the plurality of the automobiles 100 by the map generation system 1 having the configuration described above. The current time as used here is the absolute time, for example, the universal time.

Figure 4:
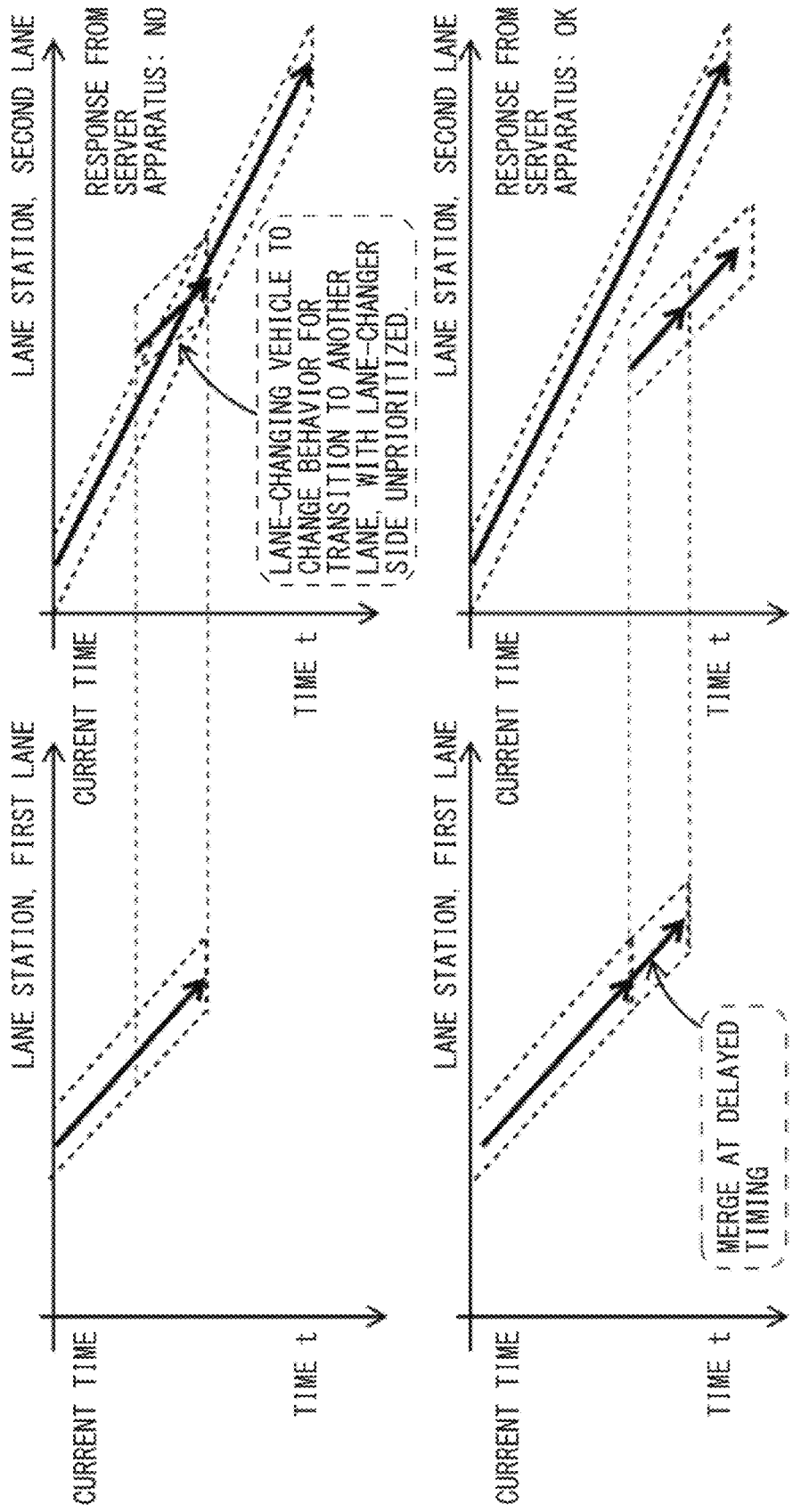
FIG. 4 illustrates a region algorithm in merging according to an embodiment of the disclosure.
Figure 9:
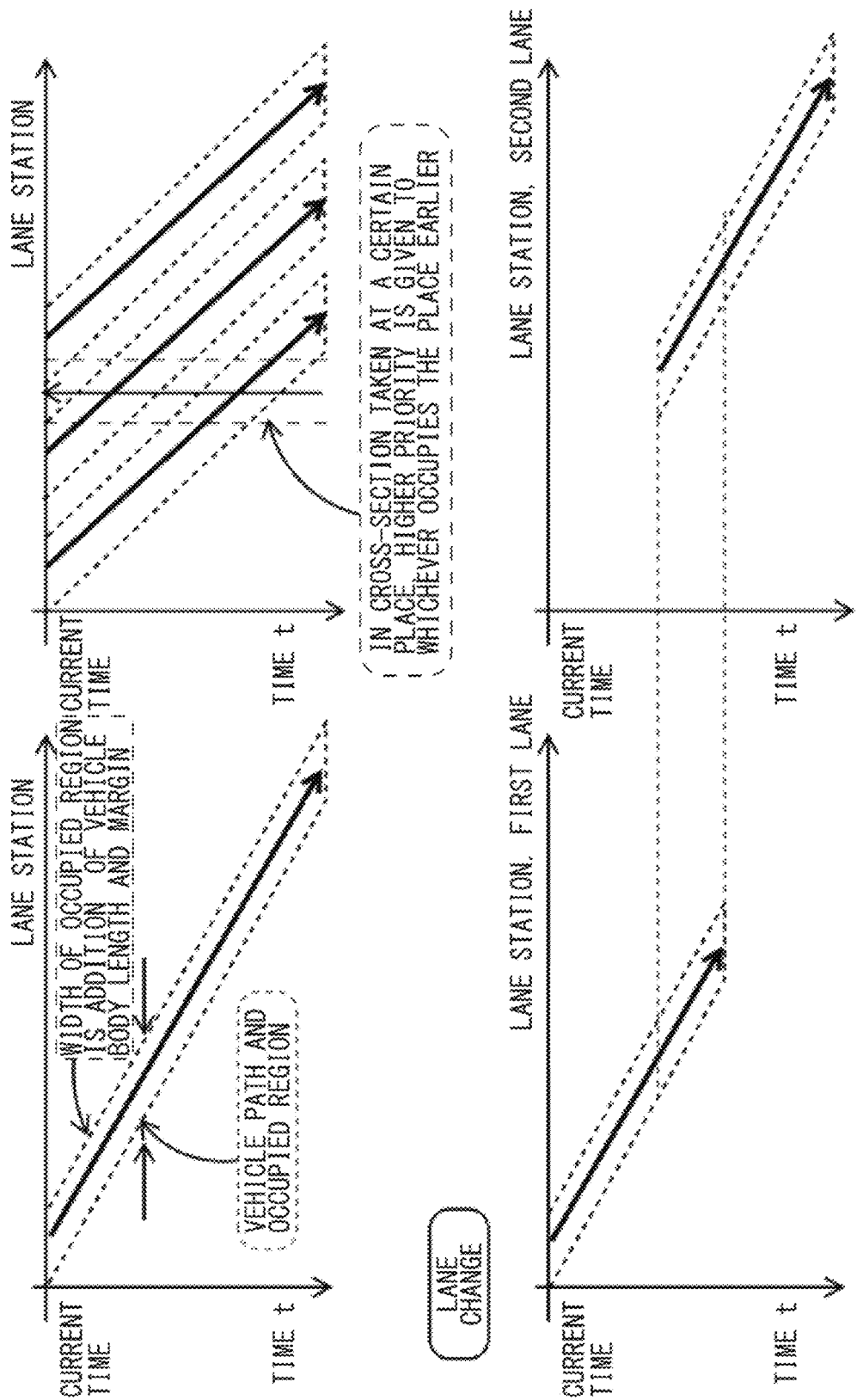
FIG. 9 illustrates a region algorithm regarding how to determine priority according to an embodiment of the disclosure.

FIGS. 4 and 9 illustrate region algorithms of the automobiles 100 on the occasion of merging, i.e., a lane change, according to this embodiment. The current state map data creation unit of the server apparatus 130 may change the time attached to the data from the data storage unit to the server time, and generate a map on plane coordinates, with a horizontal axis representing time coordinates and a vertical axis representing position coordinates, plotting changes in the positions of the respective automobiles 100 with time. At this occasion, the traveling region of the automobile 100 may be set as a "Path" (hereinafter, a traveling lane) calculable on the plane. A solid line represents a moving state of a moving object, i.e., the automobile 100. The vertical axis denotes the time in the more distant future, as extends downward in a negative direction. In one example, the vertical axis denotes the time including the actual traveling absolute time. The horizontal axis denotes the lane, as extends rightward in a positive direction. A slope of each solid line represents a speed of the moving object. In a case where two solid lines cross in a direction of the horizontal axis, it follows that the corresponding automobiles 100 are expected to interfere with each other. As the slope of the solid line increases, the solid line is sloped more vertically, which means that the speed becomes lower. Broken lines on both sides of the solid line represents an occupied region. A gap between the broken lines indicates a width of the occupied region. The width may include an addition of a body length (in vertical and horizontal directions) of the automobile 100A and a margin. Moreover, in a case where the automobiles 100 on a single lane are arranged, a determination may be made that at the predicted traveling time, higher priority is given to whichever moving body occupies a specific position earlier. This makes it possible to avoid any expected interference. A direction of an arrow indicates the forwarding direction of the automobile 100A.

In FIG. 4, two diagrams on the left side illustrate a first lane, i.e., a merge lane, while two diagrams on the right side illustrate a second lane, i.e., a main lane. As illustrated in the upper left diagram, the automobile 100A is traveling on the first lane. In a case where the automobile 100A attempts to make a lane change to the second lane, as illustrated in the upper right diagram, the solid line indicating the automobile 100A crosses the solid line indicating the automobile 100B traveling on the second lane, in a predicted traveling time period. Thus, interference is expected to occur as seen from the diagram. In a case where the traveling speed is reduced as illustrated in the lower left diagram, the two solid lines do not cross in the predicted traveling time period, as illustrated in the lower right diagram. Thus, with a determination of absence of expected interference, a notification may be given to the automobile 100A, to instruct the automobile 100A to reduce the speed to merge.

Figure 5:
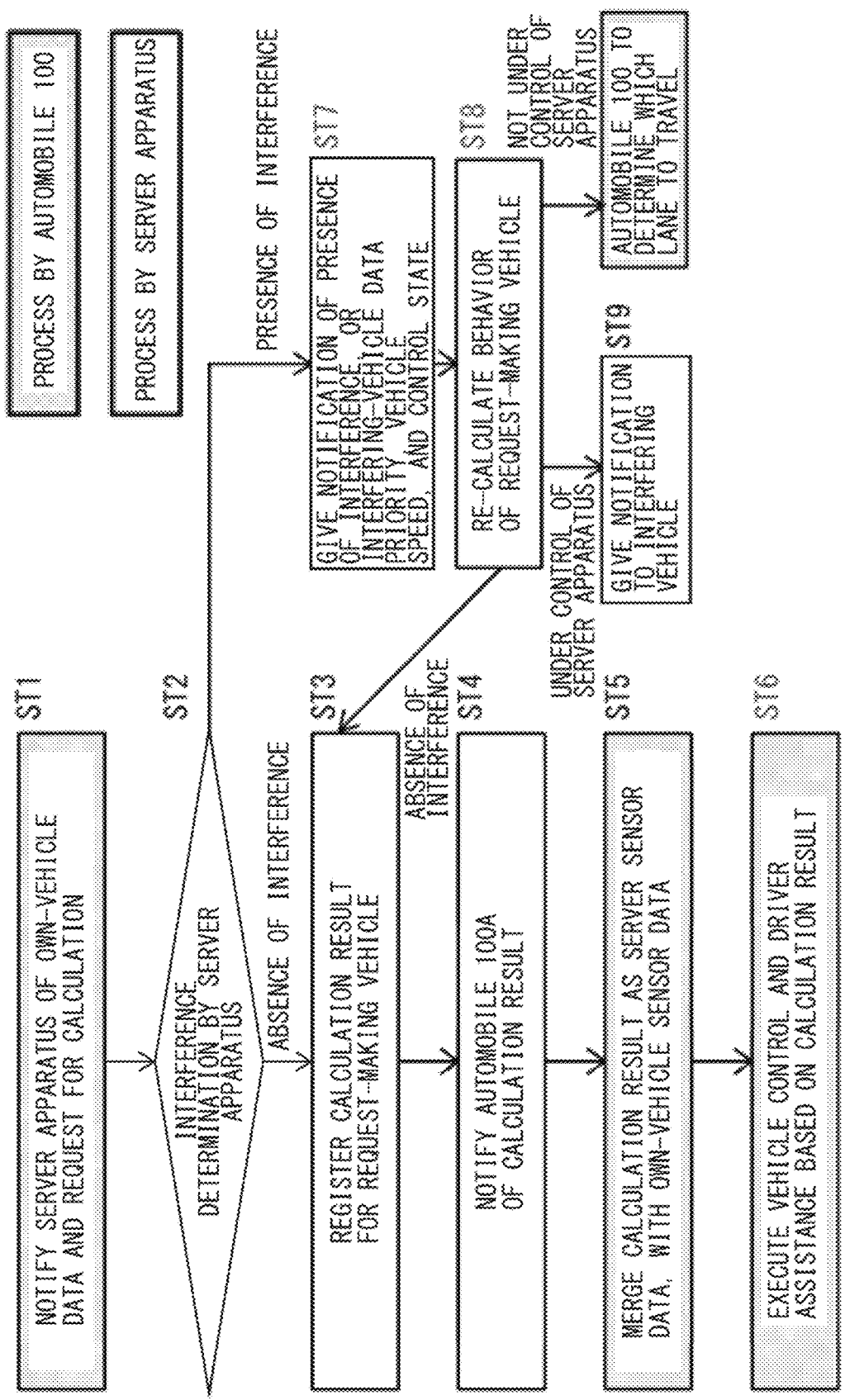
FIG. 5 is a flowchart in a case with expected interference according to an embodiment of the disclosure.

FIG. 5 is a flowchart in a case of merging according to this embodiment. In a case where the automobile 100 is available for communication, the external communication ECU 27 may repetitively execute transmission and reception processes of the own-vehicle data. The external communication ECU 27 may transmit and receive the own-vehicle data on cycles of, for example, a few milliseconds to a few seconds both inclusive. In one example, the cycles may be variable with a speed state of the automobile 100. On high speed travel, the cycle may be 10 milliseconds to 300 milliseconds both inclusive to provide a braking distance long enough for an occupant to cope with the situation.

In step ST1, the external communication ECU 27 may transmit the own-vehicle data and the vehicle time to the server apparatus 130, and make a request for an instruction or assistance regarding the vehicle behavior. The own-vehicle data may include, for example, the own-vehicle position, behavior during the manual driving and/or the automated driving, the detection data, and the specific data 5.

In step ST2, the server apparatus 130, receiving the data as mentioned in step ST1, may extract data related to the traveling region of the automobile 100A from the various kinds of the collected data. The server apparatus 130 may refer to the vehicle time and the transmission absolute time of the extracted data. If any piece of the extracted data with an unacceptable deviation, the server apparatus 130 may determine that the relevant piece of the data is unreliable, and refrain from incorporating the relevant piece of the data into the current state map data. If any piece of the extracted data with the reliable time attached, the server apparatus 130 may change the time attached to the relevant piece of the data, to the server time. The server time may be the universal time in the received data, e.g., the GNSS data. It is to be noted that the server time thus changed may have a margin as an acceptable range in the future and/or in the past. On the basis of the data regarding the traveling region of the automobile 100A generated on the basis of the server time, the current state map data creation unit may generate the current state map data as a plane or a three-dimensional body.

In a case where the map is generated as the plane, the traveling region of the automobile 100A may be set as the "Path" calculable on the plane.

Using the current state map data thus generated, the forward region calculation unit may perform simulation, i.e., the predictive calculation, based on the predicted traveling time, to determine presence or absence of expected interference on the traveling lane. The predicted traveling time is future time ahead of the server time at which the automobile 100A travels in the assumed region.

It is to be noted that in creating the current state map data, adjustment may be made to the predicted traveling time. This may involve changing the current state map data according to the traveling state, e.g., the vehicle speed, of the automobile 100. However, it suffices that at least at the actual traveling absolute time of the automobile 100, the predicted traveling time does not fall behind the actual traveling absolute time. Even in a case where the predicted traveling time falls behind the actual traveling absolute time, it suffices that no inconvenience is caused to the actual travel. In one example, the lower the traveling speed of the automobile 100, the greater an allowance for the predicted traveling time falling behind the actual traveling absolute time. In another example, the predicted traveling time used in the simulation may be in the more distant future than the reception absolute time.

In step ST3, in a case with a determination of the absence of expected interference in step ST2, the server apparatus 130 may register, in the data storage unit, the predicted behavior of the automobile 100A that has transmitted the request.

In step ST4, the calculation transmission unit of the server apparatus 130 may transmit, through the network 101, to the communication unit of the automobile 100A that has transmitted the request, the behavior of the automobile 100A, the vehicle data around the position of the automobile 100A as the own vehicle, and the server time. The behavior of the automobile 100A may include the forward region predictive calculation result 14A.

In step ST5, the automobile 100A, receiving the forward region predictive calculation result 14A as a response to the request, may compare the reception absolute time to the vehicle time. In a case with an unacceptable deviation, the automobile 100A may correct the time of the communication clock 600. The automobile 100A may assume the forward region predictive calculation result 14A to be server sensor data, and subject the forward region predictive calculation result 14A to conversion into relative position coordinates, for use as sensor data regarding the automobile 100A.

In step ST6, the automobile 100A may use the sensor data based on the forward region predictive calculation result 14A, to perform the automated driving, or to provide an occupant as a driver with instructions and/or assistance.

In step ST7, in a case with a determination of the presence of expected interference in step ST2, the server apparatus 130 may notify the automobile 100A of data regarding an interfering automobile with respect to the predicted behavior of the automobile 100A that has transmitted the request.

The data regarding the interfering automobile may include, for example, vehicle priority on the traveling lane, the vehicle speed, and a control state. In a case with a determination that there is time left to re-calculate before the expected interference with the interfering vehicle, the flow may proceed to step ST8. In a case with a determination that no time is left for re-calculation, the flow may proceed to step ST5, in which a determination as to, for example, which traveling lane to travel on, may be made on the automobile 100 side. It is to be noted that the vehicle priority on the traveling lane, the vehicle speed, and the control state may be received together or individually. They are all received by the steps related to the determination on the re-calculation.

In step ST8, the re-calculation may be made, to avoid the expected interference with the interfering automobile. As a result of the re-calculation, in a case where the behavior of the automobile 100A is determined to avoid the expected interference, the flow may proceed to step ST3.

In step ST9, in a case where the interfering automobile is under the control of the server apparatus 130, or being assisted by the server apparatus 130, that is, in a case where the interfering automobile is under influence of the forward region predictive calculation result 14A of the server apparatus 130, the server apparatus 130 may re-calculate the behavior of the automobile 100A and the interfering automobile, to avoid the expected interference with each other. In a case where the result of the re-calculation is determined, the flow may proceed to step ST3.

Figure 6:
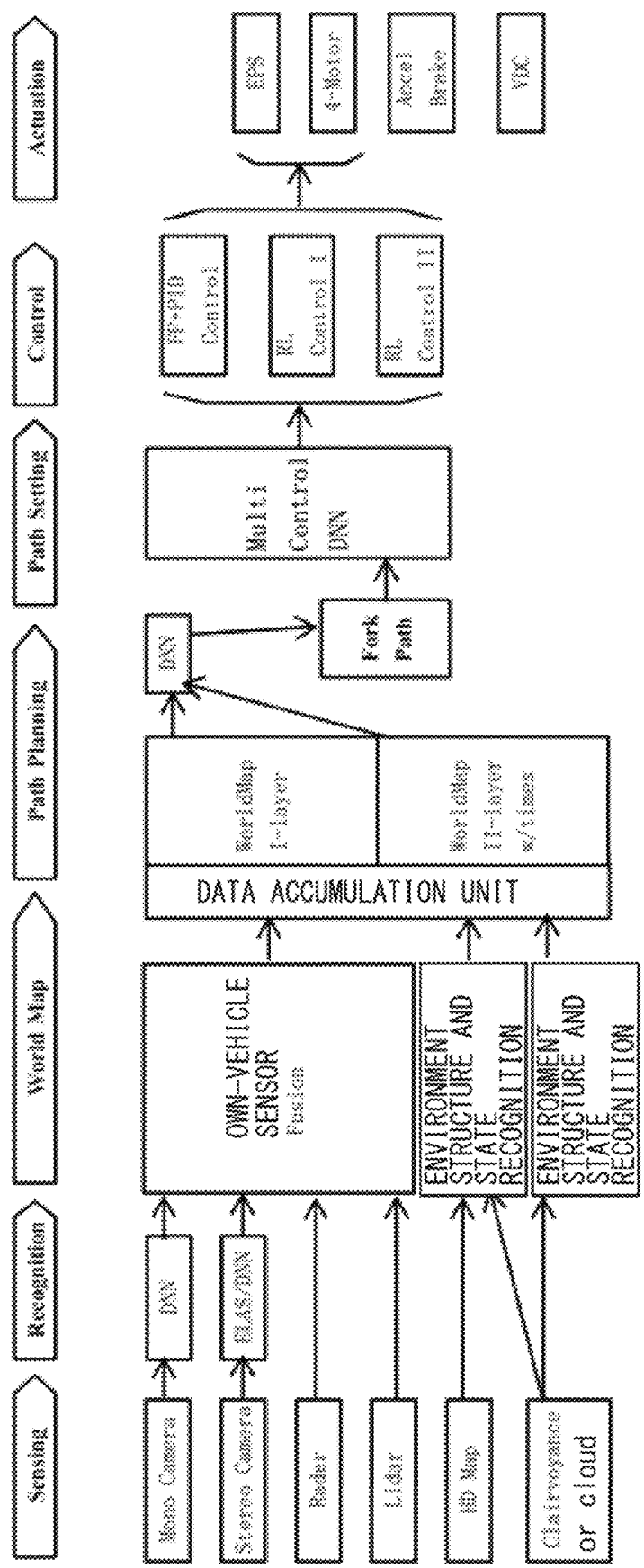
FIG. 6 is a schematic diagram of a map generation system according to an embodiment of the disclosure.

Description is given next of an embodiment of the disclosure. As illustrated in FIG. 6, in an embodiment of the disclosure, various pieces of sensor data held by a vehicle may be accumulated in a server group such as cloud computing. In the server group, future prediction may be generated on the basis of virtual data space, i.e., the current state map data. The virtual data space, or the current state map data, may realize virtual space as mapping of the real world at the server time. The virtual data space, or the current state map data, may be expressed as a plane or a three-dimensional body, and also called a world map. In such future prediction, in a case with prediction of occurrence of expected interference with a surrounding vehicle in transit space of the own vehicle, or in a case with prediction of occurrence of prohibition of passage through the transit space, the own vehicle has to refrain from selecting the path.

In one embodiment, a server apparatus is configured to communicate, through a network, with terminals. The terminals are each configured to collect data regarding the surroundings. The server apparatus is configured to construct the current state map data (hereinafter, the world map) on the basis of the data regarding the surroundings and the map data held by each of the terminals.

The automobile 100A may receive world map data regarding the surroundings of the own vehicle, from the server apparatus 130. The automobile 100A may receive the detection data related to the surroundings of the own vehicle, and supplement data held by surrounding vehicles. For example, the own vehicle may perform simulation in the latest traveling direction of the own vehicle on the world map, to confirm whether a spatial region, i.e., the "Path", involved in the forwarding of the own vehicle is occupied. In a case with the absence of expected interference, the automobile 100A may pass through the space region. As a result of the simulation, in a case with the presence of expected interference, the following calculation (i) and/or (ii) may be virtually performed using the world map.
- (i) searching for an alternative region that temporarily allows the own vehicle to pass through at transit time at which the own vehicle passes through the relevant section.
- (ii) changing the transit time at which the own vehicle passes through the relevant section, to avoid the expected interference.

In the forgoing calculation (i) and (ii), the following items (iii), (iv) and (v) may be taken into consideration.
- (iii) regions that allow the own vehicle to pass through are assumed to form a predicted future track of the own vehicle. The predicted future track is temporally continuous and spatially continuous.
- (iv) processing is made that differs in the occupied region between automated driving vehicles and manual driving vehicles. The automated driving vehicles include those under the control of the server apparatus 130 generating the world map, and/or those under the control of other systems. The manual driving vehicles include those eventually operated by a human, without being under any control.
- (v) In "Control", a coordinate system of the data to be outputted from the server apparatus 130 generating the world map is changed to a polar coordinate system including azimuth angle data and position data to be used in "Sensing".

It is to be noted that non-limiting examples of the spatial region, i.e., the "Path", that temporarily allows the own vehicle to pass through may include a road shoulder, a temporary lane change zone, and an opposite lane where no oncoming vehicle is present.

Figure 7:
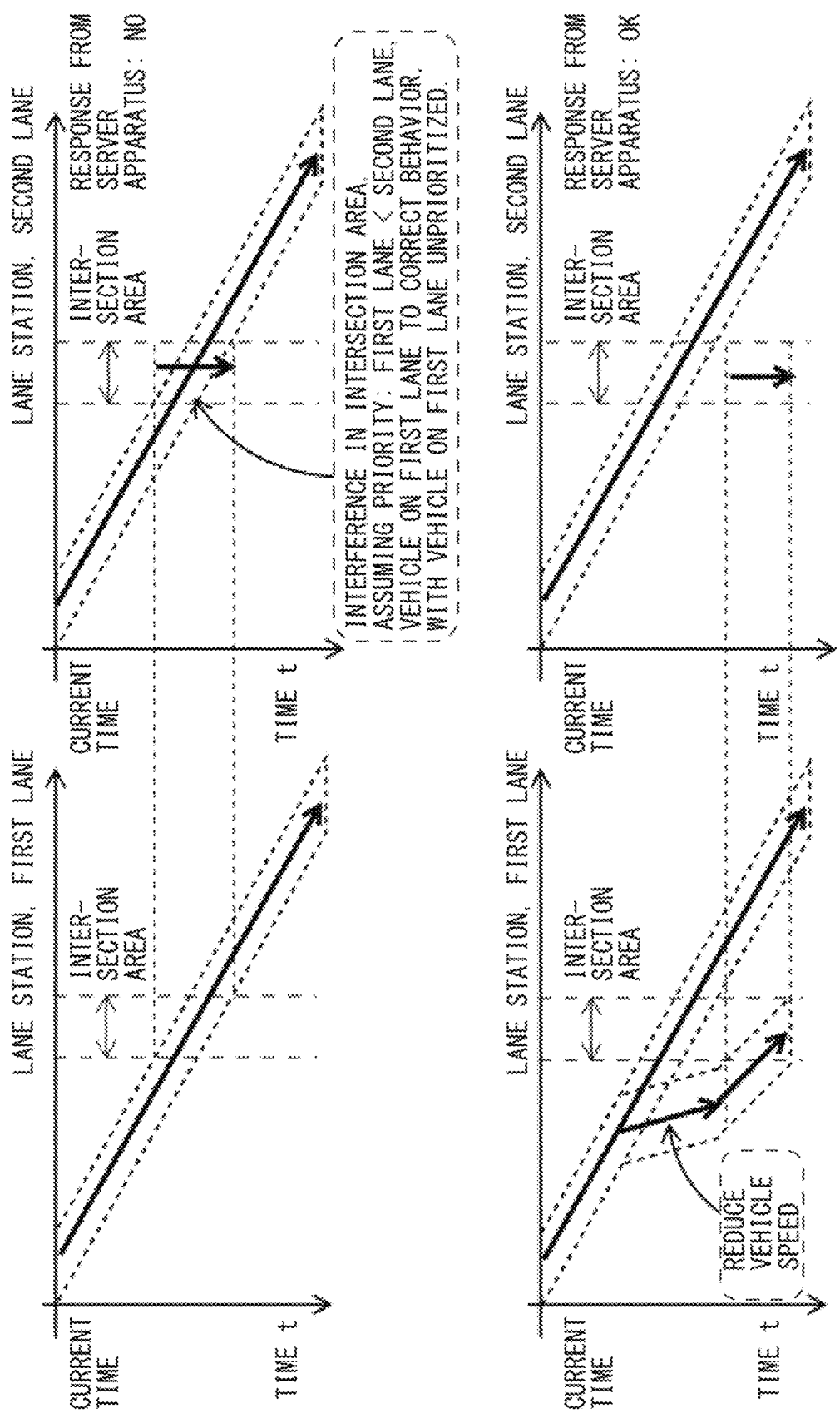
FIG. 7 illustrates a region algorithm at an intersection according to an embodiment of the disclosure.

Description is given next of an embodiment of the disclosure. As illustrated in FIG. 7, in an intersection area, in the map generation system 1, on the occasion of a movement (lane change) from the first lane (merge lane) to the second lane (priority lane), the server apparatus 130 may carry out forward region calculation, to find that the automobile 100A traveling on the first lane at the vehicle speed at the transmission absolute time is expected to interfere with the automobile 100B traveling on the second lane, at the predicted traveling time of entry of the automobile 100A to the intersection. Thus, as illustrated in the lower left diagram of FIG. 7, the server apparatus 130 may transmit the forward region predictive calculation result 14A to the automobile 100A, to instruct the automobile 100A to reduce the vehicle speed, to change the predicted traveling time of the entry of the automobile 100A into the intersection, and to avoid the expected interference with the automobile 100B.

Figure 8:
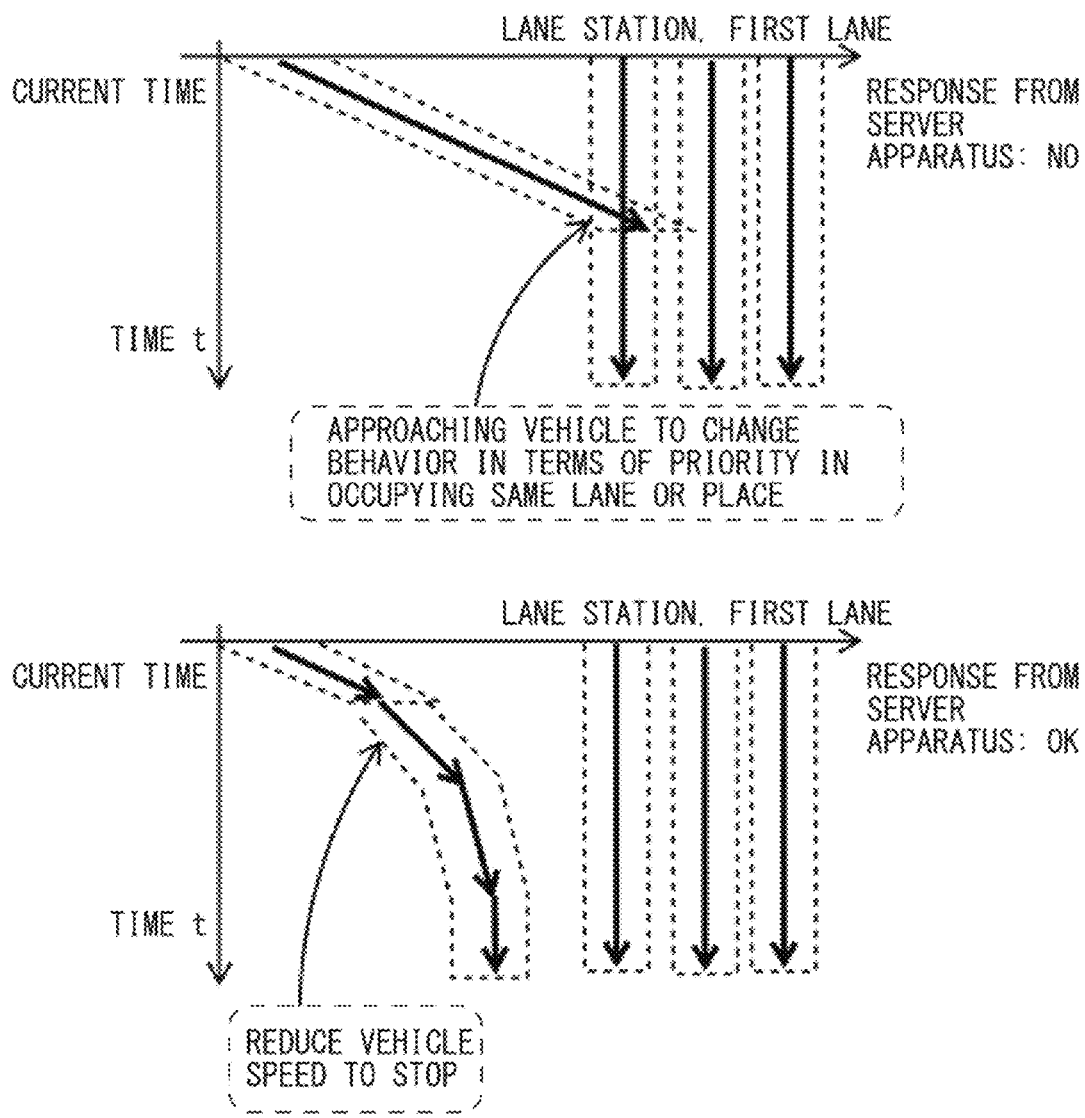
FIG. 8 illustrates a region algorithm in traffic congestion according to an embodiment of the disclosure.

Description is given next of an embodiment of the disclosure. As illustrated in FIG. 8, in a case with traffic congestion ahead, in the map generation system 1, the automobile 100A under the control of the server apparatus 130 or being assisted by the server apparatus 130 is moving (making a lane change) to the first lane. On the first lane with the traffic congestion, the solid line corresponding to the automobile 100B expected to be interfered is sloped vertically.

In this case, the server apparatus 130 may transmit the forward region predictive calculation result 14A to the automobile 100A, to instruct the automobile 100A to reduce the vehicle speed toward an end of the traffic congestion and to stop at the end of the traffic congestion.

Figure 10:
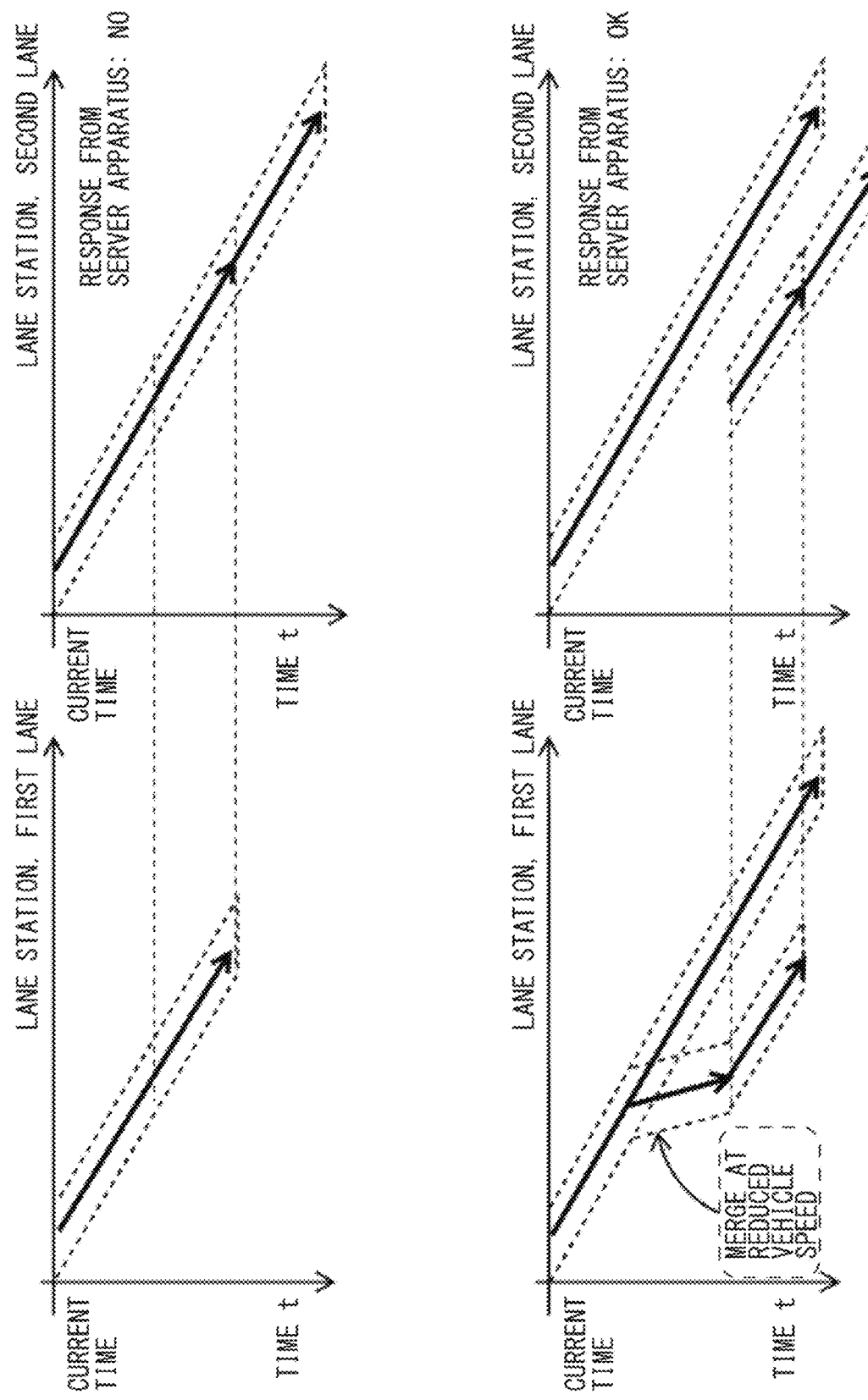
FIG. 10 illustrates a region algorithm in merging at a constant speed according to an embodiment of the disclosure.

Description is given next of an embodiment of the disclosure. As illustrated in FIG. 10, in a case of merging at a substantially constant speed, in the map generation system 1, on the occasion of the movement (lane change) from the first lane (merge lane) to the second lane (priority lane), the server apparatus 130 may carry out the forward region calculation, to find that the automobile 100A traveling on the first lane at the vehicle speed at the transmission absolute time is expected to interfere with the automobile 100B traveling on the second lane, at the predicted traveling time of the movement to the second lane.

Thus, as illustrated in the lower left diagram of FIG. 10, the server apparatus 130 may transmit the forward region predictive calculation result 14A to the automobile 100A, to instruct the automobile 100A to reduce the vehicle speed and to change the predicted traveling time of the movement to the second lane, to avoid the expected interference with the automobile 100B.

Description is given next of an embodiment of the disclosure. The server apparatus 130 may be provided in, for example, a base station for mobile phone, and the network may be a mobile phone network. Let us assume a case where the automobile 100A makes setting of a movement over a relatively large area such as a movement on a highway. In this case, in the automobile 100A, an occupant may operate the navigation system 20 to provide the setting of the destination A.

A traffic data calculation system 900 may allow the current state map data creation unit to generate the current state map data 14 to the destination A on the basis of a request for travel. The traffic data calculation system 900 may output the current state map data 14 to the forward region calculation unit.

The forward region calculation unit may perform simulation of the travel of the automobile 100A to the destination A, on the current state map data 14 to the destination A of the automobile 100A. Thus, the forward region calculation unit may perform road assignment processing with respect to the traveling lane, i.e., the "Path".

The automobile 100A may output, to the display device 41, current state map data 14 to the destination A or the peripheral data regarding the automobile 100A at the time of reception of the forward region predictive calculation result 14A. Alternatively, the automobile 100A may start the travel by the automated driving.

The server time and the server ID may be attached to the received forward region predictive calculation result 14A. The automobile 100A may store the received forward region predictive calculation result 14A, the server time, and the server ID. The automobile 100A may hold the server ID as the specific data 5 regarding the automobile 100A. In making the behavior request, the automobile 100A may transmit, to the server apparatus 130, the specific data 5 regarding the automobile 100A including the server ID.

In a case where the automobile 100A passes through a plurality of ranges under the control of, or the assistance by, respective server apparatuses, until arrival at the destination A, the automobile 100A may make the behavior request of respective ones of the server apparatus within their respective ranges.

At this occasion, there are possibility of relative deviation between the vehicle time and the absolute time of each of the plurality of the server apparatuses, possibility of mixture of the ranges under the control of the respective server apparatuses, and possibility of relative time deviation in the vehicle-to-vehicle communication or roadside communication. This may cause possibility of an unanticipated incident due to the time deviation with respect to the actual traveling absolute time. Thus, in a case where the automobile 100A receives a server ID different from the server ID held by the automobile 100A, the automobile 100A may determine that the automobile 100A is communicating with a server apparatus other than the server apparatus with which the automobile 100A communicates regarding the forward region predictive calculation result 14A. In this case, the automobile 100A may update the server time and the server ID held by the automobile 100A, to avoid any expected interference due to the time deviation with respect to the surroundings.

Description is given next of an embodiment of the disclosure. The server apparatus 130 may be provided in, for example, a base station 111A for mobile phone, and the network 101 may be a mobile phone network. Let us assume a case where the automobile 100A makes the setting of the movement over a relatively large area such as the movement on a highway. In this case, in the automobile 100A, an occupant may operate the navigation system 20 to provide the setting of the destination A.

The traffic data calculation system 900 may allow the current state map data creation unit to generate the current state map data 14 to the destination A on the basis of the request for the travel. The traffic data calculation system 900 may output the current state map data 14 to the forward region calculation unit.

The forward region calculation unit may perform the simulation of the travel of the automobile 100A to the destination A, on the current state map data 14 to the destination A of the automobile 100A. Thus, the forward region calculation unit may perform the road assignment processing with respect to the "Path".

The automobile 100A may output, to the display device 41, the received forward region predictive calculation result 14A and the peripheral data regarding the automobile 100A at the time of the reception of the forward region prediction calculation result 14A. Alternatively, the automobile 100A may start the travel by the automated driving.

The server time and the server ID may be attached to the received forward region predictive calculation result 14A. The automobile 100A may store the received forward region predictive calculation result 14A, the server time, and the server ID. The automobile 100A may hold the server ID as the specific data 5 regarding the automobile 100A. In making the behavior request, the automobile 100A may transmit, to the server apparatus 130, the specific data 5 regarding the automobile 100A including the server ID.

In a case where the automobile 100A passes through a plurality of ranges under the control of, or the assistance by, the respective server apparatuses, until the arrival at the destination A, when the automobile 100A is located outside the range of the server apparatus 130 that is supposed to respond to the behavior request, the automobile 100A fails in obtaining a response. The server apparatus 130 also fails in transmitting the forward region predictive calculation result 14A. Thus, the data remains unprocessed.

In communicating, there may be a case with time deviation between the server time held by the automobile 100A and the time held by an automobile other than the automobile 100A, e.g., the automobile 100B, or a traffic system. In such a case, the automobile 100A may determine that the automobile 100A is located outside a communication range of the server apparatus including the input data compilation unit and the output data compilation unit. Thus, the automobile 100A may update the server time held by the automobile 100A, with the travel surrounding time held by the automobile other than the automobile 100A, and/or the traffic system, to update the server time and the server ID held by the automobile 100A. Thus, it is possible to avoid any expected interference due to the time deviation with respect to the surroundings. Moreover, even in a case with incomplete coverage over data involved in the arrival at the destination A, it is possible to behave in accordance with surrounding vehicles around the own vehicle.

Figure 11:
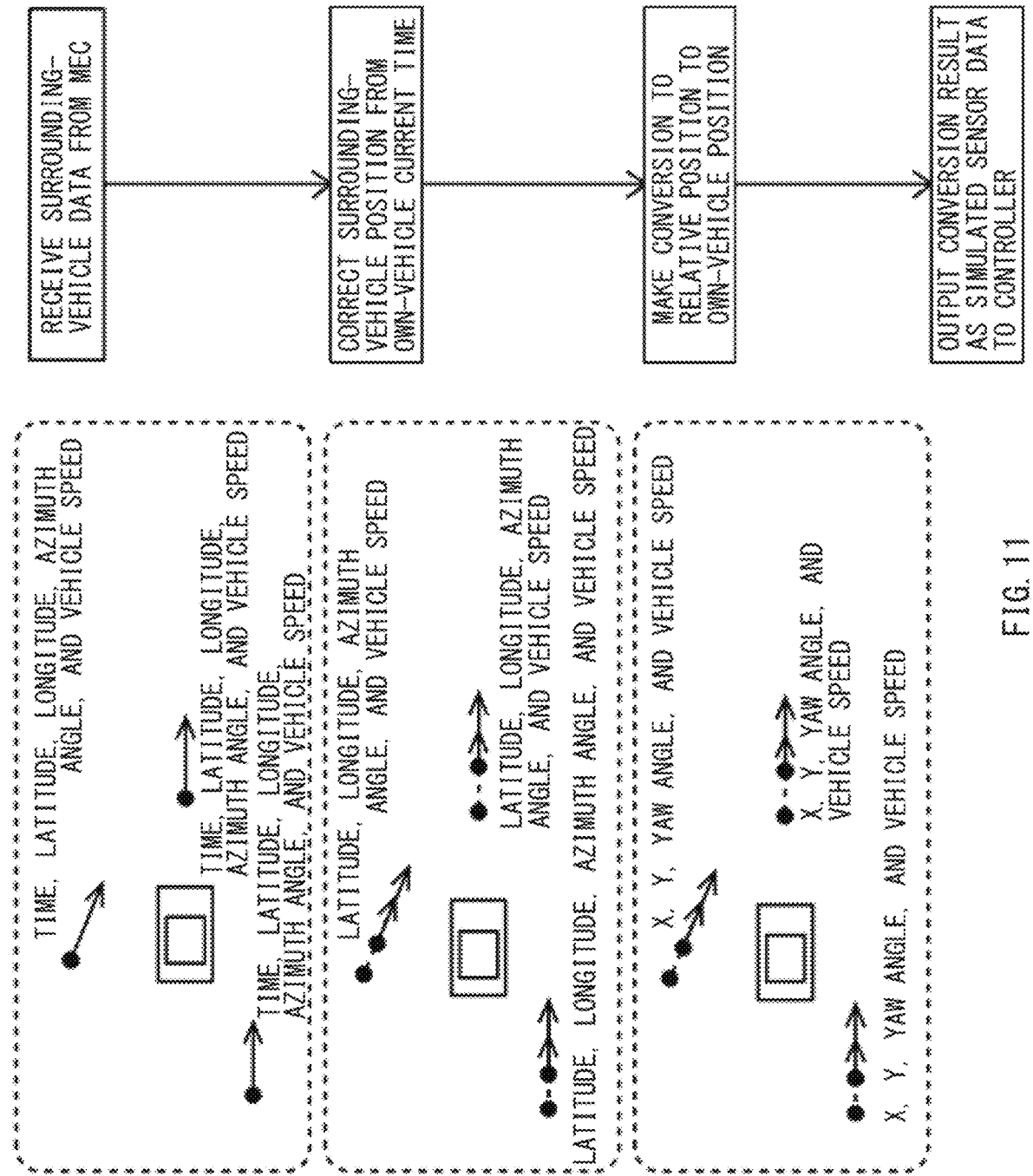
FIG. 11 illustrates locator processing with MEC server data according to an embodiment of the disclosure.
Figure 12:
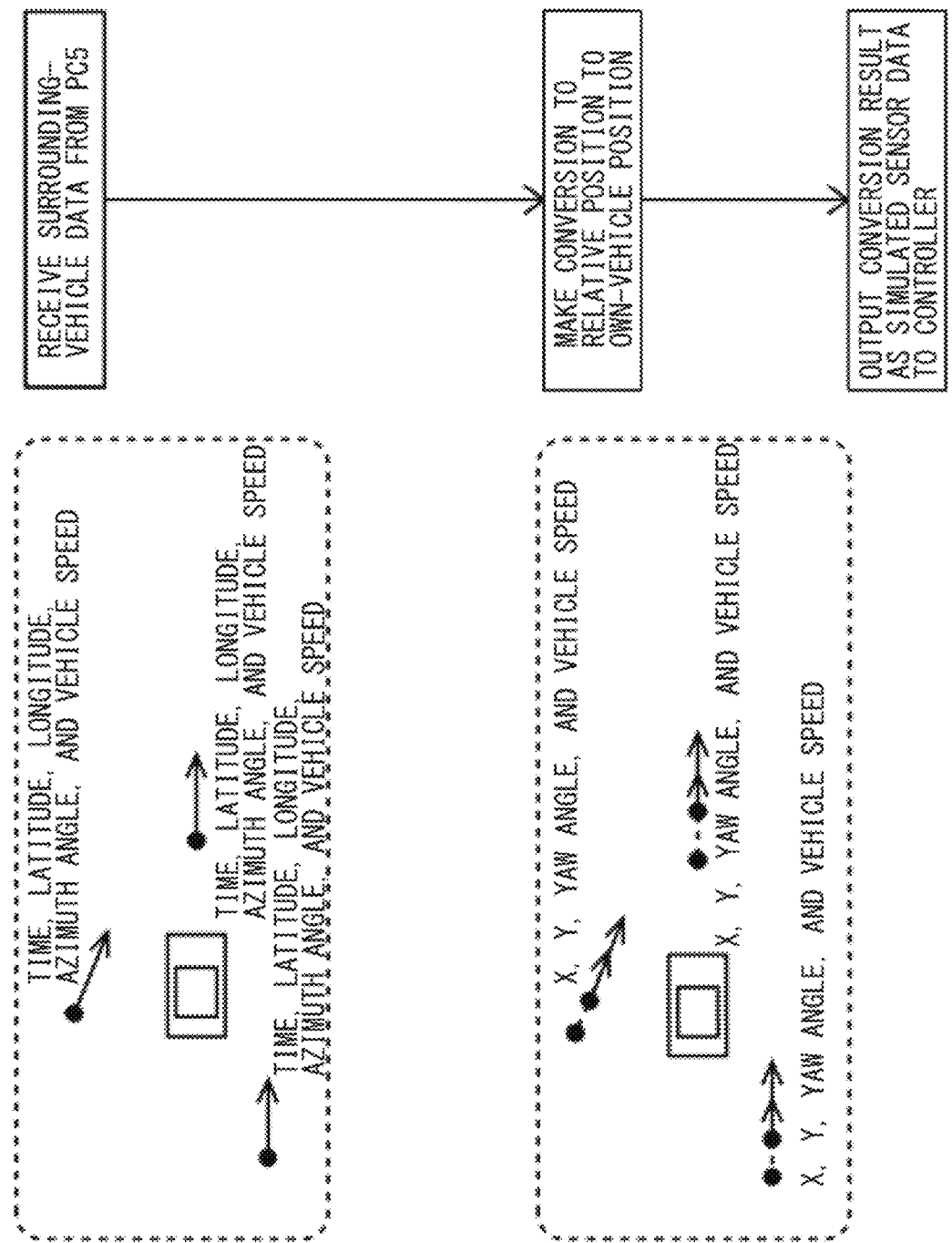
FIG. 12 illustrates locator processing with PC5 data according to an embodiment of the disclosure.

Description is given next of an embodiment of the disclosure, with reference to FIGS. 11 and 12. A map generation system according to this embodiment includes a vehicle, an input data compilation device, and an output data compilation device. The vehicle includes a terminal. The terminal includes a communication unit configured to communicate through a network. The input data compilation device includes a data accumulation unit, and a current state map data creation unit. The data accumulation unit is configured to communicate with the communication unit of the terminal, to accumulate data held by the terminal. The data held by the terminal includes data regarding the vehicle, a surrounding vehicle, or both. The current state map data creation unit is configured to create current state map data using data accumulated by the data accumulation unit, and map data, regional data, or both. The regional data includes data regarding a location of the vehicle. The output data compilation device includes a forward region calculation unit and a calculation transmission unit. The forward region calculation unit is configured to make predictive calculation of a forward region of the vehicle, using the current state map data. The calculation transmission unit is configured to communicate with the communication unit regarding a result of the predictive calculation. A traveling region of the vehicle is determined on the basis of the current state map data. The current state map data includes at least a predetermined piece of the map data in addition to the current state map data. The traveling region determined is partitioned into a plurality of divisions in units of at least a predetermined distance, time, or both. The vehicle may update the current state map data before passing through one of the plurality of the divisions. The forward region calculation unit, the vehicle, or both may output simulated sensor data based on the predictive calculation.

FIGS. 11 and 12 illustrate locator processing according to an embodiment of the disclosure. In the locator processing, a coordinate system (X1, Y1) of data to be outputted by a world map server may be changed to a polar coordinate system (vector component) having azimuth angle data and position data used in the sensors of the automobile 100.

Spatial data may include numerical data that allows the spatial data to be disposed at a certain location on the earth. The numeral may constitute part of the coordinate system (spatial coordinates) that provides a data reference frame.

Thus, it is possible to specify the spatial data on the surface of the earth, to align a position of a piece of data with that of another piece of data as a reference, and to perform analysis with high spatial precision, and to create the world map. The data may be defined in both horizontal and vertical coordinate systems. In the horizontal coordinate system, the data may be specified on the entire surface of the earth. In the vertical coordinate system, it is possible to specify a relative height or depth regarding the data. In the predictive calculation in plane coordinates, the horizontal coordinate system is sufficient. Calculation in stereo coordinates involves the vertical coordinate system. In conversion into the coordinate system, the origin may be the automobile 100A as the own vehicle, or the automobile 100B as the surrounding automobile around the automobile 100A, or alternatively, the origin may be provided on the world map. The automobile 100A and the automobile 100B each include the terminal. The automobile 100A and the automobile 100B may notify the server apparatus 130 of the vehicle travel data regarding the respective automobiles 100A and 100B, from the respective communication units 6, through the network 101, at predetermined time intervals and/or at predetermined distance intervals. The server apparatus 130 may generate the current state map data, perform the simulation, and output the forward region prediction calculation result 14A, to the automobile 100A. Using the forward region prediction calculation result 14A, the automobile 100A may generate a simulated output sensor value that is comparable to the detection value by a sensor system of the automobile 100A. By comparing the detection data to the simulated output sensor value, it is possible to recognize an object located outside a recognition range of the automobile 100A. Moreover, in a case with a delay in data transmission in the network, or in a case where performance of the sensor system of the automobile 100A is lowered or unavailable, or even in a case with blind spots that are invisible originally, it is possible for the automobile 100A to travel with the forward region predictive calculation result 14A as the result of the predictive calculation. Furthermore, using the simulated sensor data makes it possible to travel on the basis of simulated data, leading to higher level of safety.

Although some preferred embodiments of the technology are described above by way of example with reference to the accompanying drawings, the technology is by no means limited to the embodiments described above. It should be appreciated that modifications and alterations may be made by persons skilled in the art without departing from the scope as defined by the appended claims.

According to the aspects of the technology, the current state map data is created, using the data held by the terminal. The data held by the terminal includes the peripheral data regarding the vehicle. This allows the current state map data to include not only the currently registered, existing map data but also temporary data that is not registered in the existing map data. Using the current state map data, the simulation, or the calculation, is made, of the forward region scheduled to be traveled by the vehicle. Hence, it is possible to allow the vehicle to travel with enhanced safety, at the scheduled transit time ahead of the current vehicle time.

According to the aspects of the technology, the plurality of the terminals may communicate with the data accumulation unit. Hence, it is possible to provide reliability of the data. Furthermore, avoiding any expected relative interference on the basis of the ratio of occupation of a road at predetermined time makes it possible to allow the vehicle to travel as if a driver was actually driving the vehicle when entering an opposite lane, overtaking while crossing a centerline, or traveling on a road shoulder, in a case where the vehicle occupies the road for a very short time stopping over a stop line to make a stop or to wait for a traffic signal to change.

According to the aspects of the technology, the current state map data is created, using the data held by the terminal. The data held by the terminal includes the peripheral data regarding the vehicle. Using the current state map data, the simulation is made. This makes it possible to hold the simulated data simulated in advance, leading to preparation for depopulation and/or an instantaneous interruption of communication because of, for example, switching of communication base stations. Hence, it is possible to allow the vehicle to travel on the basis of the simulated data even in a case where communication is interrupted.

According to the aspects of the technology, even in a case where network operators each hold fragments of the peripheral data at the current time, the current state map data is created, using the fragments of the data. Using the current state map data, the simulation is made, to generate the simulated sensor data. This makes it possible to compare the simulated sensor data to actual data held by a moving body. Hence, it is possible to provide an allowance for the deviation in the relative position, regardless of an output form of the current state map data.

According to the aspects of the technology, the server apparatus may include the current state map data creation unit and the forward region calculation unit. The server apparatus communicates with the vehicle through the network. This makes it sufficient for the vehicle performing the automated driving to be in charge of the sensing with the use of the sensors of the own vehicle. Hence, it is possible to perform the automated driving without providing the vehicle with significant calculation processing features.

According to the aspects of the technology, the server ID of the server apparatus that has communicated regarding the vehicle data and the result of the predictive calculation may be held as the vehicle-specific data. Accordingly, at the start of the travel outside the range of the server apparatus in charge that has communicated regarding the result of the predictive calculation, it is possible to determine whether the vehicle has started the travel, on the basis of the server ID. This leads to quick synchronization with the server time.

According to the aspects of the technology, the server time of the server apparatus that has communicated regarding the vehicle data and the result of the predictive calculation may be held as the vehicle-specific data. Accordingly, at the start of the travel outside the range of the server apparatus in charge that has communicated regarding the result of the predictive calculation, it is possible to communicate with a surrounding vehicle or a traffic system regarding the server time, to quickly determine whether the vehicle has started the travel outside the range of the server apparatus in charge. This leads to quick synchronization with the traveling time of the surrounding vehicle.

The server apparatus 130 and the control devices or the ECUs of the automobile 100 illustrated in FIGS. 1 to 3 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the server apparatus 130 and the control devices or the ECUs of the automobile 100. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the server apparatus 130 and the control devices or the ECUs of the automobile 100 illustrated in FIGS. 1 to 3.

It should be appreciated that modifications and alterations may be made by persons skilled in the art without departing from the scope as defined by the appended claims. The use of the terms first, second, etc. does not denote any order or importance, but rather the terms first, second, etc. are used to distinguish one element from another. The technology is intended to include such modifications and alterations in so far as they fall within the scope of the appended claims or the equivalents thereof.

The invention claimed is:

1. A map generation system, comprising:
a vehicle including a terminal, the terminal including a communication unit configured to communicate through a network; and
one or more server apparatuses provided in one or more base stations for mobile phone, the one or more server apparatuses configured to:
communicate with the communication unit of the terminal every 10 msec to 300 msec to receive data held by the terminal,
accumulate the data held by the terminal, the data held by the terminal including data regarding the vehicle, and a surrounding vehicle,
create current state map data, as a virtual data space, using the data accumulated by the data accumulation unit, map data, and regional data, the regional data including data regarding a location of the vehicle, the current state map data comprising a speed of the vehicle, a location of the surrounding vehicle and a speed of the surrounding vehicle,
make predictive calculation of a forward region of the vehicle, using the location of the vehicle, the speed of the vehicle, the location of the surrounding vehicle and the speed of the surrounding vehicle in the current state map data so as to determine whether the vehicle and the surrounding vehicle interfere with each other in a future time,
communicate with the communication unit regarding a result of the predictive calculation,
change the speed of the vehicle when the vehicle and the surrounding vehicle interfere with each other in the future time based on the result of the predictive calculation,
communicate, through the network, with one or more vehicles configured to perform automated driving, wherein the vehicle is configured to travel, by the automated driving, manual driving, or both, in accordance with the forward region to be allotted by the one or more server apparatuses,
hold server time and a server identification, and
in communicating with the communication unit regarding the result of the predictive calculation, transmit the server time and the server identification together with the result of the predictive calculation.

2. The map generation system according to claim 1, wherein
the vehicle includes one or more of the terminals,
at least one of the one or more of the terminals is configured to communicate with the one or more server apparatuses, and
the one or more server apparatuses determines behavior of the vehicle in relative positional relation to an object other than the vehicle in a traveling region of the vehicle is a ratio of occupation of a road at predetermined time.

3. The map generation system according to claim 1, wherein:
the vehicle holds, as vehicle-specific data, vehicle data and the server identification held by the one or more server apparatuses has communicated the result of the predictive calculation,
in communicating with any one of the one or more server apparatuses, the vehicle is configured to communicate regarding at least the vehicle-specific data regarding the vehicle, and
in communicating through the network, on a condition that the vehicle receives a server identification different from the server identification held by the vehicle, the vehicle is configured to assume that the vehicle is communicating with a server apparatus other than the one or more server apparatuses has communicated regarding the result of the predictive calculation, and to update the server time and the server identification held by the vehicle.

4. The map generation system according to claim 1, wherein:
the vehicle holds, as vehicle-specific data, vehicle data and the server identification held by the one or more server apparatuses has communicated regarding the result of the predictive calculation,
in communicating with the surrounding vehicle, the vehicle is configured to communicate regarding at least the vehicle-specific data regarding the vehicle, and
in communicating, on a condition that the server time held by the vehicle is different from time held by the surrounding vehicle other than the vehicle or the traffic system and that the vehicle fails to establish communication with the one or more server apparatuses, the vehicle is configured to assume that the vehicle is outside a communication range of the one or more server apparatuses, and to update the server time held by the vehicle with time of traveling environment held by the surrounding vehicle other than the vehicle or the traffic system.

5. A map generation system, comprising:
a vehicle including a terminal, the terminal including a communication unit configured to communicate through a network; and
one or more server apparatuses provided in one or more base stations for mobile phone, each of the one or more server apparatuses being configured to:
communicate with the communication unit of the terminal every 10 msec to 300 msec to receive data held by the terminal;
accumulate the data held by the terminal, the data held by the terminal including data regarding the vehicle, and a surrounding vehicle,
create current state map data using data accumulated, map data, and regional data, the regional data including data regarding a location of the vehicle, the current state map data comprising a speed of the vehicle, a location of the surrounding vehicle and a speed of the surrounding vehicle, make predictive calculation of a forward region of the vehicle, using the location of the vehicle, the speed of the vehicle, the location of the surrounding vehicle and the speed of the surrounding vehicle in the current state map data, so as to determine whether the vehicle and the surrounding vehicle interfere with each other in a future time, communicate with the communication unit regarding a result of the predictive calculation, wherein:

change the speed of the vehicle when the vehicle and the surrounding vehicle interfere with each other in the future time based on the result of the predictive calculation, hold server time and a server identification, and in communicating with the communication unit regarding the result of the predictive calculation, the server time and the server identification are transmitted together with the result of the predictive calculation.

* * * * *